(12) United States Patent
Tamura et al.

(10) Patent No.: US 8,064,453 B2
(45) Date of Patent: Nov. 22, 2011

(54) TRANSPORT STREAM PROCESSING APPARATUS

(75) Inventors: Sou Tamura, Osaka (JP); Isao Ikegami, Osaka (JP)

(73) Assignee: Panasonic Corporation, Osaka (JP)

( * ) Notice: Subject to any disclaimer, the term of this patent is extended or adjusted under 35 U.S.C. 154(b) by 1158 days.

(21) Appl. No.: 11/179,646

(22) Filed: Jul. 13, 2005

(65) Prior Publication Data

US 2006/0026487 A1 Feb. 2, 2006

(30) Foreign Application Priority Data

Jul. 15, 2004 (JP) .................. P2004-208921

(51) Int. Cl.
   *H04L 12/56* (2006.01)
(52) U.S. Cl. ........................................ 370/392
(58) Field of Classification Search .................. 370/241, 370/477
   See application file for complete search history.

(56) References Cited

U.S. PATENT DOCUMENTS

| | | | | |
|---|---|---|---|---|
| 4,785,349 A * | 11/1988 | Keith et al. | ............. | 375/240.23 |
| 6,467,093 B1 | 10/2002 | Inoue et al. | | |
| 6,611,497 B1 * | 8/2003 | Yamagata et al. | ............ | 370/241 |
| 7,124,283 B2 * | 10/2006 | Yamada et al. | ............... | 712/209 |
| 2002/0186775 A1 * | 12/2002 | Cordero et al. | .......... | 375/240.26 |
| 2004/0258060 A1 * | 12/2004 | Liu et al. | ....................... | 370/389 |
| 2005/0125424 A1 * | 6/2005 | Herriott et al. | ................ | 707/100 |
| 2005/0229229 A1 * | 10/2005 | Takahashi et al. | ............. | 725/118 |

FOREIGN PATENT DOCUMENTS

| | | |
|---|---|---|
| JP | 10-210461 A | 8/1998 |
| JP | 10-341419 A | 12/1998 |
| JP | 11-239186 A | 8/1999 |
| JP | 2002-64583 | 2/2002 |

OTHER PUBLICATIONS

English translation of Chinese Office Action, issued in Chinese Patent Application No. CN 200510084285.2, mailed Jul. 25, 2008.

* cited by examiner

*Primary Examiner* — Chirag G Shah
*Assistant Examiner* — Yong Zhou
(74) *Attorney, Agent, or Firm* — McDermott Will & Emery LLP

(57) ABSTRACT

A transport stream processing apparatus according to the present invention is a transport stream processing apparatus including a plurality of processing steps for separating desired data from a transport stream, and comprises a hardware transport stream separating device, a software transport stream separating device, and a processing switching device for switching to and from the respective separating devices in executing an optional processing step. The transport stream processing apparatus realizes a transport stream separation of a high performance without demanding a high operation frequency and a high CPU power and adding a circuit.

7 Claims, 23 Drawing Sheets

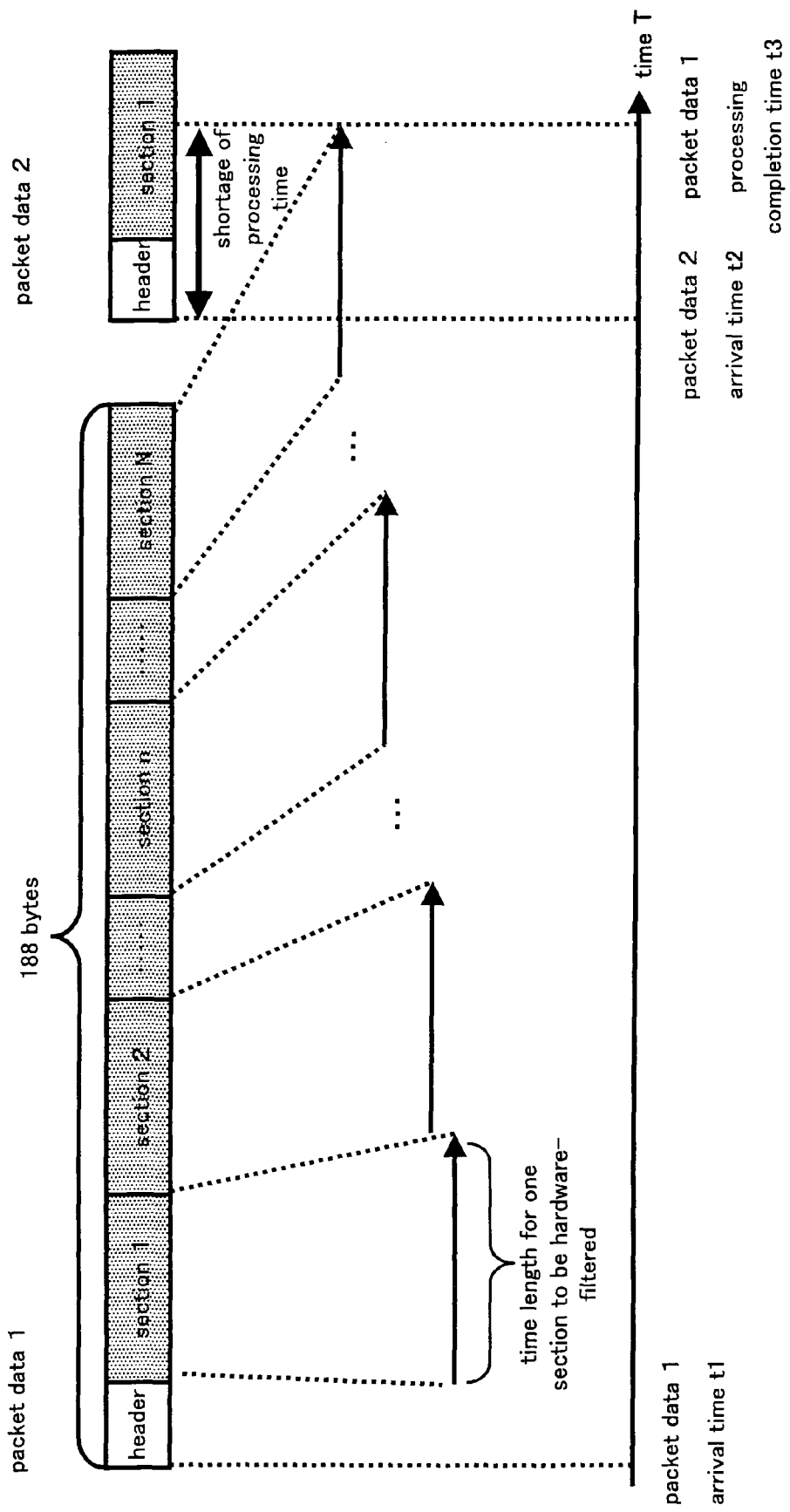

TRANSPORT STREAM PROCESSING APPARATUS

FIELD OF THE INVENTION

The present invention relates to a transport stream processing apparatus for processing data inputted by means of a transport stream packet (TSP) format in a digital broadcast receiver.

BACKGROUND OF THE INVENTION

In the CS digital broadcast available since 1995 and the BS digital broadcast available since Dec. 1, 2000 in Japan, a transport stream (TS), in which image information, audio information and additional information appended to the informations such as program information obtained by compressing digital information are multiplexed according to the MPEG2 system standard, is digitally modulated and transmitted to a broadcast station. A digital broadcast receiver separates the image, audio and other informations from the transport stream (TS) obtained by digitally demodulating a received signal and reproduces them. Such a digital broadcast receiver is increasingly widespread.

Thus, the multiplexed data such as the image and audio in the digital broadcast is transmitted via the transport stream (TS) which is a data string having a fixed length generally called a transport stream packet (TSP).

FIG. 20 is a schematic view of a general format of the transport stream packet (TSP). The transport stream packet (TSP) is a packet having the fixed length of 188 bytes, in which initial four bytes are specifically called a packet header. The first byte is a synchronizing byte for synchronizing with a processing device for processing the transport stream packet (TSP), in which a data value is constantly "47h" (h denotes a hexadecimal number). Subsequent to the first byte, a transport error indicator (TEI) bit for indicating "1" when a data error is detected in a demodulating circuit, a payload unit start indicator (PUSI) for indicating the presence of a leading position of a section or a packaged elementary stream (PES) packet, a transport scramble control (TSC) bit for indicating scramble information of the TSP, an AFC bit for indicating the presence/absence of an adaptation field, a continuity counter (CC) for indicating a packet continuity, and the like, are assigned.

The fifth byte and thereafter are comprised of an adaptation field of a variable length (N bytes) and a payload of a variable length (188-4-N bytes). The payload area stores the PES packet including the image, audio and subtitle, information for identifying a recipient, various service information and the like.

The TSP received in the digital broadcast receiver is filtered in order to retrieve only necessary data, and the data which is scrambled so that the data can be viewed/listened by particular subscribers is descrambled and then outputted. As examples of a destination of the output, a memory accessible by a CPU, an AV decoder for retrieving the audio/image, and the like, can be mentioned. An apparatus, which filters and descrambles the TSP to thereby retrieve the desired data as in the described manner, is called a transport stream separating apparatus.

The conventional transport stream separating apparatus is constituted in the manner that all of the processing steps for separating the transport stream, such as the PID filtering and descrambling, are executed by means of the hardware. As other possible constitutions of the apparatus, all of the processing steps for separating the transport stream could be executed by means of the software, or the processing steps could be executed separately on the hardware and the software in such manner that the PID filtering and descrambling are executed on the hardware and the section filtering and CRC check are executed on the software.

Examples of the transport stream separating apparatus for executing all of a plurality of processing steps for the transport stream separation by the hardware are disclosed in No. H10-341419, No. 2000-13448 (P2000-13448A) and No. H11-239186 of the Publication of the Unexamined Japanese Patent Applications. An example of the transport stream separating apparatus for dividing the plurality of processing steps for the transport stream separation between the hardware and software is disclosed in No. H10-210461 of the Publication of the Unexamined Japanese Patent Applications.

When a plurality of processing steps for the transport stream separation is entirely executed on the hardware, a high operation frequency and additional circuits are demanded in order to deal with all of possible circumstances and statuses (for example, real-time processing of a plurality of multi-sections, multiple-type scrambling method and the like). On the other hand, when the plurality of processing steps is executed on the software, a high power for the CPU is constantly required. In the case of the constitution in which the processing steps are divided, a maximum performance may not be exerted if the processing steps are divided in a fixed manner.

For example, FIG. 23 shows a processing-time correlation in the case of processing N number of multi-sections in a conventional technology. A total time length for the section filtering is increased as the number of the multi-sections is increased. Further, if a time point when the hardware completes the section filtering process goes beyond a time point when the TSP to be processed next arrives, a real time performance of the transport stream separating process cannot be guaranteed. In order to solve the problem, it was conventionally necessary to modify the constitution such as improving the operation frequency to shorten the processing time, additionally providing a buffer for temporarily memorizing any TSP which cannot be processed in time, and the like.

SUMMARY OF THE INVENTION

Therefore, a main object of the present invention is to execute a processing, which conventionally had to be mounted on hardware in exchange for improving an operation frequency and adding a circuit, by means of software.

In order to achieve the foregoing object, a transport stream processing apparatus according to the present invention is a transport stream processing apparatus comprising a plurality of processing steps in order to separate desired data from a transport stream (TS). The transport stream processing apparatus comprises a hardware transport stream separating device, a software transport stream separating device and a processing switching device for switching to and from the respective separating devices in executing an optional processing step.

According to the present invention, the transport stream (TS) is separated, not in such a manner as fixedly selecting one of the hardware processing and the software processing, but in a selectable manner. When the hardware processing or the software processing is selectively responsible for the separation depending on the circumstances, the processing, which had to be conventionally mounted on the hardware in exchange for improving the operation frequency and additionally providing a circuit, can be executed on the software. Further, in the case of mounting the software-executed processing on the hardware, the processing step is switchable. In this manner, processing performances of the hardware and software can be efficiently utilized so as to constitute a fail-soft transport stream processing apparatus capable of switching a part of the processing steps to the software before the processing performance of the hardware reaches its limit.

As states used as judgment criteria for the switchover, a bit rate of the inputted TS, a volume of the TSP stored in the temporary memorizing device for temporarily storing the TSP, a volume of the inputted TS, a time length required for the transport stream separating process, a CPU operating ratio, a volume of the multi-sections included in the PID and one TSP, and the like, can be exemplified. As the switchable processing steps, PID filtering, descrambling, section filtering, CRC check, PES packet filtering, and the like, can be exemplified, and devices for the switchover of the respective processing steps are provided.

For the switchover of the processing steps between the hardware and the software, it becomes necessary for an input/output of an optional processing step to be accessible by both of the hardware and the software. In order to realize the constitution, a processor, an output device for outputting an output result of the optional processing step for the transport stream separation to a memory accessible by the software and an input device for inputting data processed by the software to the optional processing step are preferably provided.

BRIEF DESCRIPTION OF THE DRAWINGS

The present invention is illustrated be way of example and not limitation in the figures of the accompanying drawings, in which like references indicate similar elements and in which:

FIG. 23 is a processing-time correlation chart in the case of a multi-section according to the conventional technology.

DETAILED DESCRIPTION OF THE INVENTION

Figure 21:
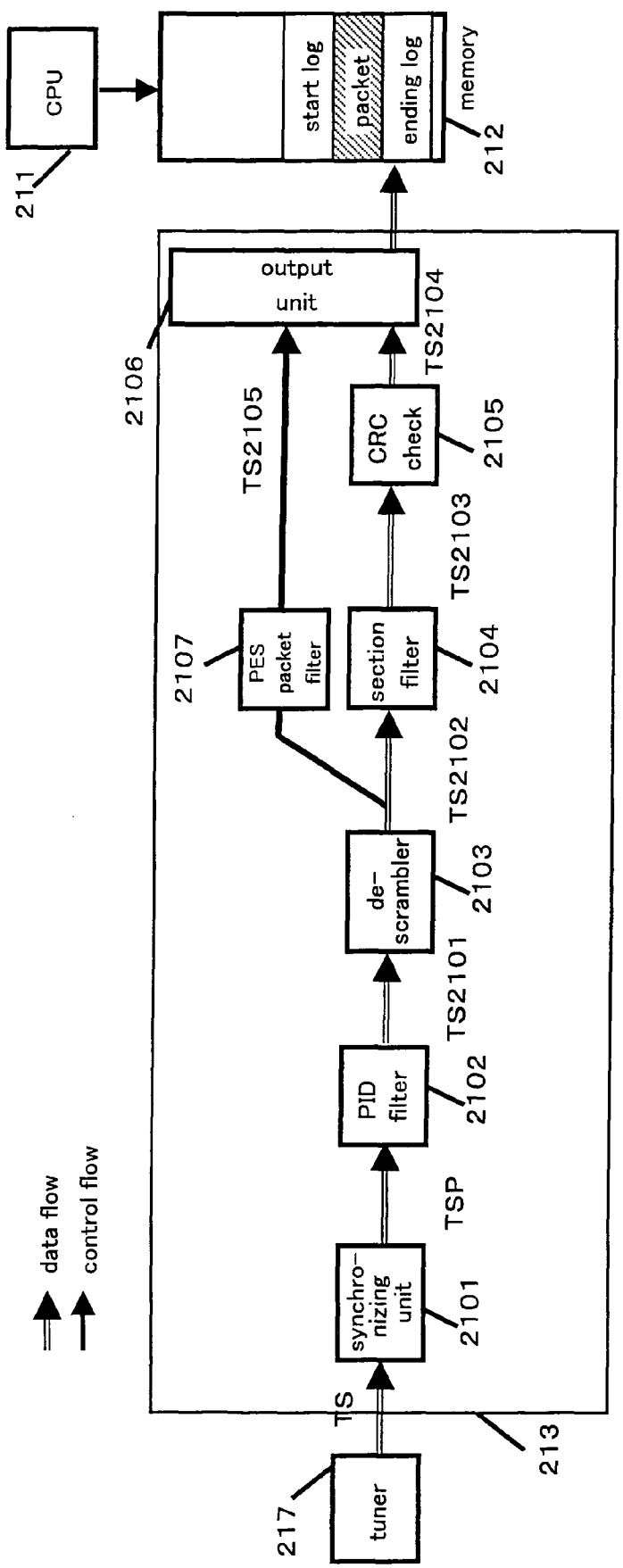
FIG. 21 is a block diagram illustrating an entire constitution of a stream processing apparatus.

Prior to the description of a preferred embodiment of the present invention, an outline of a basic constitution relating to data reception in a digital broadcast receiver to which the present invention is implemented is described referring to FIG. 21,22.

FIG. 21 is a schematic block diagram illustrating a constitution of data reception in a conventional digital broadcast receiver. A CPU 211 as a processor, a memory (memorizing device) 212 accessible by software operated on the CPU 211, a tuner 217 for frequency-selecting a targeted carrier wave from received electric waves and demodulating and error-correcting the carrier wave, the tuner 217 further selecting a transport stream from the carrier wave and outputting the transport stream, and a transport stream separating apparatus 213 are mainly responsible for the data reception. Doubled-line arrows in the drawing show a data flow. The transport stream separating apparatus comprises a synchronizing device 2101, a PID filter 2102, a descrambler 2103, a section filter 2104, a CRC checking device 2105, a memory output device 2106 and a PES packet filter 2107. The PID is synonymous with a packet identifier.

The synchronizing device 2101 detects leading data from the inputted TS to thereby extract and output the TSP.

The PID filter 2102 outputs only the necessary TSP and discards the unnecessary TSP based on the PID of the TSP inputted from the synchronizing device 2101. The descrambler 2103 judges the TSC of the TSP inputted from the PID filter 2102 and descrambles the data, if descrambled, and then outputs the descrambled data as TS 2102. When the data is non-scrambled, the data is subjected to no processing and directly outputted as the TS 2102.

The section filter 2104 retrieves a section from the inputted TSP and filters a header part of the section to thereby output only the necessary section as TS2103 and discard the unnecessary section.

The CRC checking device 2105 checks a CRC error of the section outputted from the section filter 2104 and provides a CRC check result for the section to thereby output it as TS2104 the memory 212 from the output device 2106. However, any section having no CRC (section whose SSI (Section Syntax Indicator)=0) is not subjected to the CRC check and directly outputted. The PES packet filter 2107 retrieves the PES packet from the inputted TS2102 and filters a header of the PES packet to thereby output the necessary PES packet as TS2105 from the output device 2106 to the memory 212 and discard the unnecessary PES packet.

Figure 22:
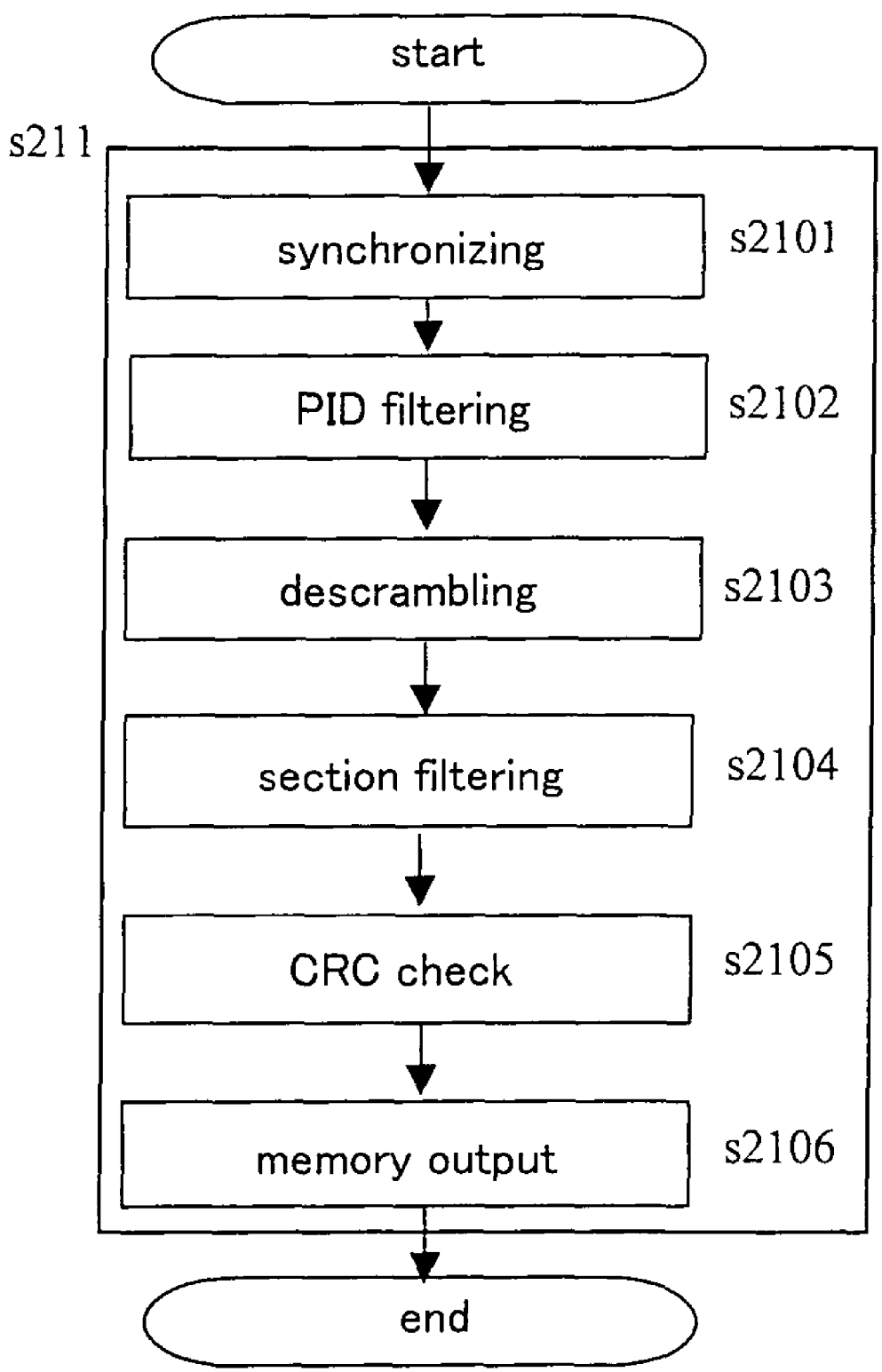
FIG. 22 is a flow chart according to a section obtaining processing.

An example of obtaining the section is shown in a flow chart of FIG. 22. As a transport stream separating step S221 by mean of hardware, a synchronizing step s2201, a PID filtering step s2202, a descrambling step s2203, a section filtering step s2204 and a CRC checking step s2205 are provided. The step s2201 is the synchronizing step, in which the leading data is detected from the inputted TS so that the TSP is extracted, proceeds to the step s2202. The step s2202 is the PID filtering step, in which only the necessary TSP is retrieved and the unnecessary TSP is discarded based on the PID of the inputted TSP, proceeds to the step s2203. The step s2203 is the descrambling step, in which the transport scramble control (TSC) of the TSP is judged so that the data, if scrambled, is descrambled, and immediately proceeds to the step s2204 when the data is not scrambled. The step s2204 is the section filtering step, in which the section is retrieved from the inputted TSP and the header part of the section is filtered so that only the necessary section is retrieved and the unnecessary section is discarded, proceeds to the step s2205. The step s2205 is the CRC checking step, in which the CRC error of the section is checked, proceeds the step s2206. The step s2206 is the memory output step, in which the data processed in the steps up to s2205 is outputted to the memory accessible by the CPU.

Hereinafter, preferred embodiments of the present invention are described referring to the drawings.

First Preferred Embodiment

Figure 1:
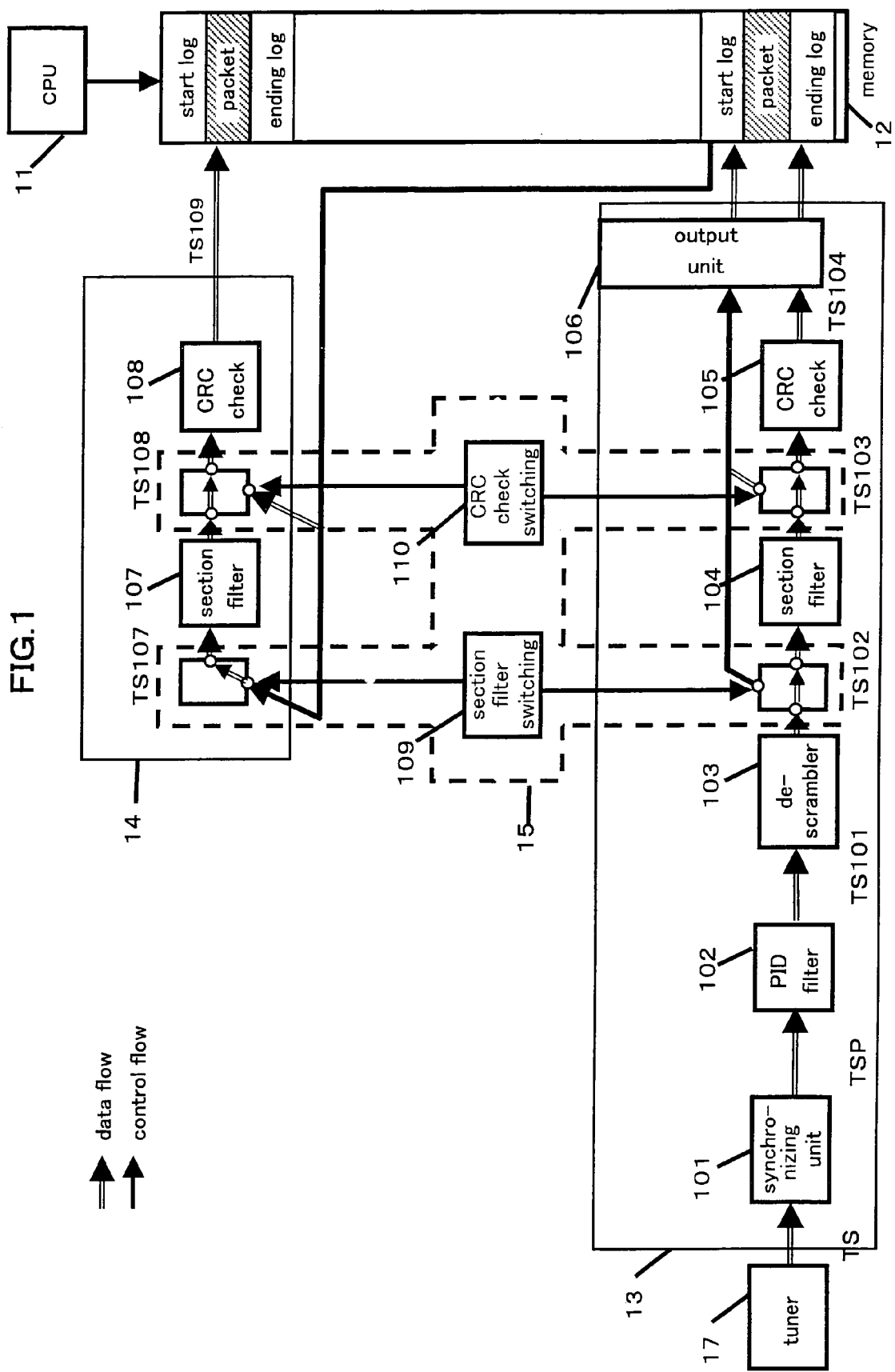
FIG. 1 is a block diagram illustrating an entire constitution of a stream processing apparatus according to a first preferred embodiment of the present invention.
Figure 2:
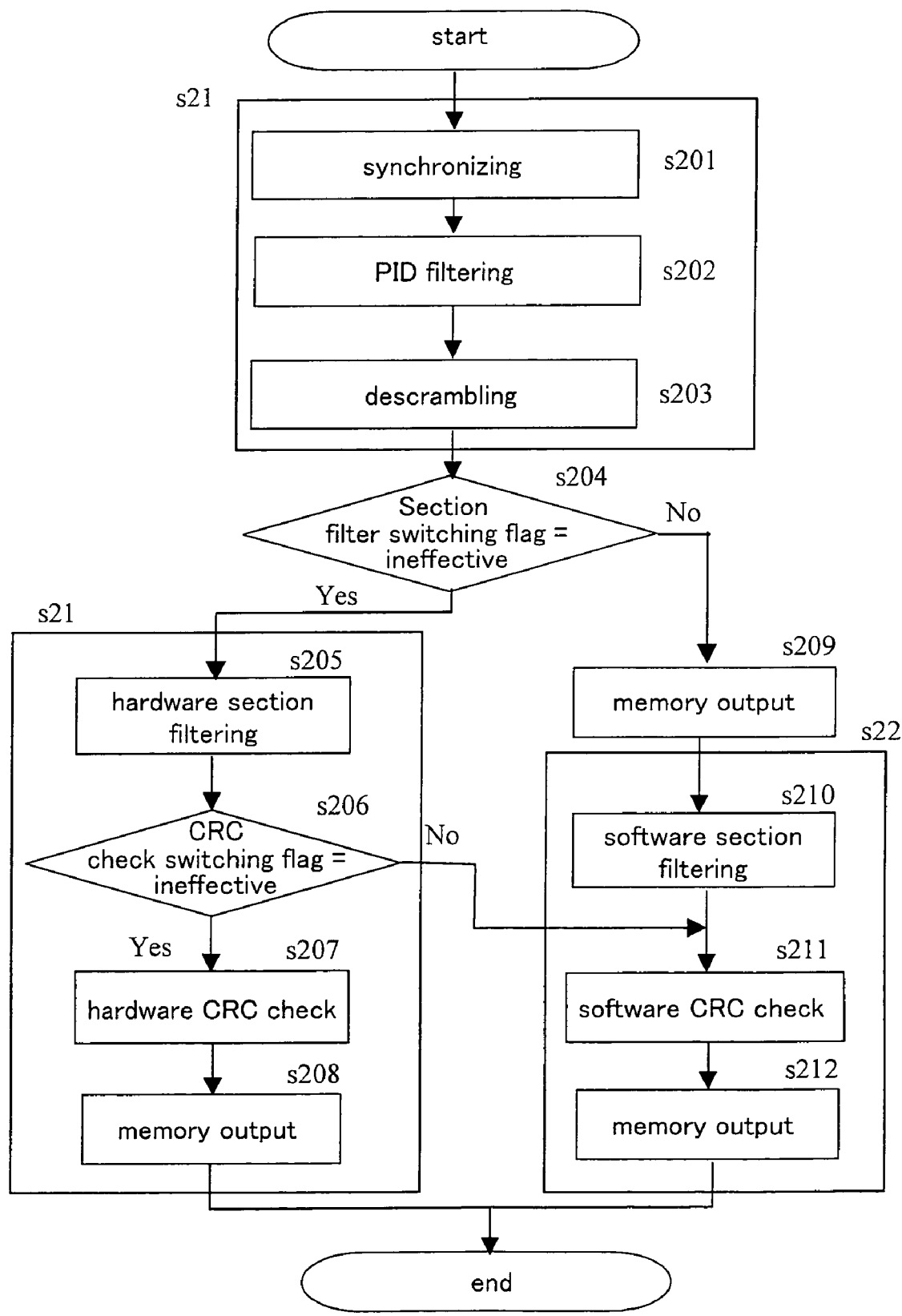
FIG. 2 is a flow chart according to the first preferred embodiment.

A first preferred embodiment of the present invention is described referring to FIGS. 1 and 2. FIG. 1 is a schematic block diagram illustrating a constitution relating to data reception in a digital broadcast receiver according to the first preferred embodiment. In the digital broadcaster receiver, a CPU 11 as a processor, a memory (memorizing device) 12 accessible by software operated on the CPU 11, a tuner 17 for frequency-selecting a targeted carrier wave from received electric waves and demodulating and error-correcting the carrier wave, the tuner 17 further selecting a transport stream from the carrier wave and outputting the transport stream, and a transport stream processing apparatus are mainly responsible for the data reception. Single-lined arrows show a control flow, while double-lined arrows shows a data flow. In FIG. 1, a transport stream processing apparatus according to the first preferred embodiment comprises a hardware transport stream separating device 13, a software transport stream separating device 14, and a processing switching device 15 for switching to and from a hardware processing by the hardware transport stream separating device 13 and a software processing by the software transport stream separating device 14 in executing a transport steam separating process.

The hardware transport stream separating device 13 comprises a synchronizing unit 101, a PID filter 102, a descrambler 103, a section filter 104, a CRC checking unit 105 and an output unit 106. The synchronizing unit 101 detects leading data from an inputted transport stream (TS) to thereby extract and output a transport stream packet (TSP) The PID filter (PID filtering section) 102 outputs only the necessary TSP as TS101 and discards the unnecessary TSP based on PID of the TSP inputted from the synchronizing unit 101. The descrambler 103 judges a transport scramble control (TSC) of the TS101 inputted from the PID filter 102, and descrambles data if the data is scrambled and outputs it as TS102, while immediately outputting the non-scrambled data as the TS102.

The software transport stream separating device 14 comprises a section filter (section filtering section) 107 and a CRC checking unit 108.

The processing switching device 15 comprises a section filter switching flag for switching to and from respective section filtering processes of the section filter 104 and the section filter 107 and a CRC check switching flag for switching to and from respective CRC checking processes of the CRC checking unit 105 and the CRC checking unit 108. The section filter switching flag and the CRC check switching flag both can be set by the CPU 11.

Hereinafter is described how a processing switchover is executed based on states of the section filter switching flag and the CRC check switching flag.

When the section filter switching flag is ineffective, the section filtering is executed by the hardware transport stream separating device 13 as in the conventional technology. The section filter 104 retrieves a section from the inputted TSP and filters a header part of the section. As a result of the filtering, the section filter 104 supplies a section start log to the necessary section and outputs it as TS103, while discarding the unnecessary section.

When the section filter switching flag is effective, the section filtering is not executed by the hardware transport stream separating device 13, and the TS102 is supplied with a section filtering through (passing) log and outputted to the memory (memorizing device) 12 from the output unit 106.

When the CRC check switching flag is ineffective, the CRC check is executed as by the hardware in the same manner as in the conventional technology. The CRC checking unit 105 checks a CRC error of the section in the TS103 outputted from the section filter 104 and supplies a CRC check result log to the section and outputs it as TS104 to the memory 12 from the output unit 106. The CRC checking unit 105, however, omits the CRC check with respect to the section having no CRC (section whose SSI (Section Syntax Indicator)=0) and directly outputs it. As an alternative constitution, the section whose CRC check result is NG, may possibly be discarded.

When the CRC check switching flag is effective, the CRC check by the hardware is omitted, and the TS103 with no log supplied thereto is outputted to the memory 12 from the output unit 106.

Next, an operation of the CPU 11 with respect to the data stored in the memory 12 is described.

The CPU 11, in the case of processing the packet stored in the memory 12, first reads the logs appended to the top and bottom of the packet stored in the memory 12, and the processing switchover is executed based on the state of the logs. As an alternative constitution, the processing switchover may possibly be alternatively executed referring to the section filter switching flag and the CRC check switching flag of the processing switching device 15 in place of the log. In the first preferred embodiment, the processing switchover based on the log is described.

In the case in which the read log includes the section start log and the CRC check result log, the section is processed in the same manner as in the conventional technology. When the read log is the section filtering through (passing) log, the section filtering and CRC check using the software are executed. Upon the confirmation of the section filtering through (passing) log, the software transport separating device 14 reads the written packet from the memory 12 and inputs it as TS107 to the section filter 107. The section filter 107 retrieves the section from the TS107 and filters the header part of the section to thereby output only the necessary section as TS108 and discard the unnecessary section.

The TS107 constitutes (all or a part of) a payload part of the TSP possibly storing the section in the form of a multi-section. Therefore, the software section filter 107 continues its processing until all of the sections of the written payload part are outputted as the TS108. As an indicator for continuing the processing, information of a length (byte number) of the written payload may possibly be appended to the section filtering through (passing) log.

Since the TS 107 constitutes (all or a part of) the payload part of the TSP, there is a possibility that the sections stored therein extend across more than one TSP. Because of the possible constitution, PF (Pointer Field) information, PUSI information, and the like, may possibly be appended to the section filtering through (passing) log. The CRC checking unit 108 checks the CRC error of the section TS108 outputted by the section filter 107, and supplies the CRC check result log thereto and outputs it as TS109 to the memory 12. However, the section not provided with the CRC (section whose SSI (Section Syntax Indicator)=0) is not subjected to the CRC check and directly outputted. As an alternative constitution, the relevant section may possibly be discarded in the case in which the CRC check result is NG. A memory region as a destination of the output from the CRC checking unit 108 may be or may not be the same as a memory region as an origin of the input of the section filter 107. When the read log does not include the CRC check result log, the CRC check using the software is executed. When it is confirmed that the CRC check result is not included, the software transport separating device 14 reads the written packet from the memory 12 and inputs it as the TS108 to the CRC checking unit 108.

The CRC checking unit 108 checks the CRC error of the TS108 and supplies the CRC check result log thereto to thereby output it as the TS109 to the memory 12. However, the section not provided with the CRC (section whose SSI (Section Syntax Indicator)=0) is not subjected to the CRC check and directly outputted. As an alternative constitution, the relevant section may possibly be discarded when the CRC check result is NG. The memory region as the destination of the output from the CRC checking unit 108 may be or may not be the same as a memory region as an origin of the input of CRC checking unit 108.

Thus, when the transport stream separation, which was not hardware-executed, is executed by means of the software instead, the section to be written in the memory can be processed in the same manner as in the conventional technology.

FIG. 2 shows a processing flow chart.

Below is described a case, in which a section filter switching step s204 for switching to and from the hardware processing and the software processing in the section filtering and a CRC check switching step s206 for switching to and from the hardware processing and the software processing in the CRC check are included as a processing switching step s23.

A hardware transport stream separating step s21 includes a synchronizing step s201, a PID filtering step s202, a descrambling step s203, a section filtering step s205 and a CRC checking step s207. A software transport stream separating step s22 includes a section filtering step s210 and a CRC check step s211.

Below is given a description based on the processing flow.

The step s201 is the synchronizing step, in which the leading data is detected from the inputted TS so as to extract the TSP, proceeds to the step s202. The step s202 is the PID filtering step, in which only the necessary TSP is retrieved and the unnecessary TSP is discarded based on the PID of the inputted TSP, proceeds to the step s203. The step s203 is the descrambling step, in which the TSC (Transport Scramble Control) of the TSP is judged so that the data is descrambled if scrambled while no processing is executed when the data is not scrambled, proceeds to the step S204.

When the section filter switching flag is ineffective in the section filter switching step s204, the step s205 of the hardware transport separating step s21 is carried out, while a step s209 is carried out when the flag is effective. The step s205 is the section filtering step, in which the section is retrieved from the inputted TSP and the header part of the section is filtered so as to retrieve the necessary section and discard the unnecessary section. Then, the step s206 is carried out next.

When the CRC check switching flag is ineffective in the CRC check switching step s206, the step s207 of the hardware transport separating step s21 is carried out, while the step s211 of the software transport separating step s22 is carried out when the flag is effective.

The step s207 is the CRC checking step, in which the CRC error of the section is checked, proceeds to a step s208. The step s208 is a memory output step, in which the data processed in the steps up to the step 207 is outputted to the memory 12 accessible by the CPU 11, proceeds to the step s210 of the software transport separating step s22. The s210 is the section filtering step, in which the section is retrieved from the inputted TSP and the header part of the section is filtered so as to retrieve the necessary section and discard the unnecessary section, proceeds to the step s211. The step s211 is the CRC checking step, in which the CRC error of the section is checked, proceeds to the step s212. The step s212 is the memory output step, in which the data processed in the steps up to the step s211 is outputted to the memory 12 accessible by the CPU 11.

When the transport separating step, which was not hardware-executed, is executed by means of the software, the section to be written in the memory can be processed in the same manner as in the conventional technology.

Second Preferred Embodiment

Figure 3:
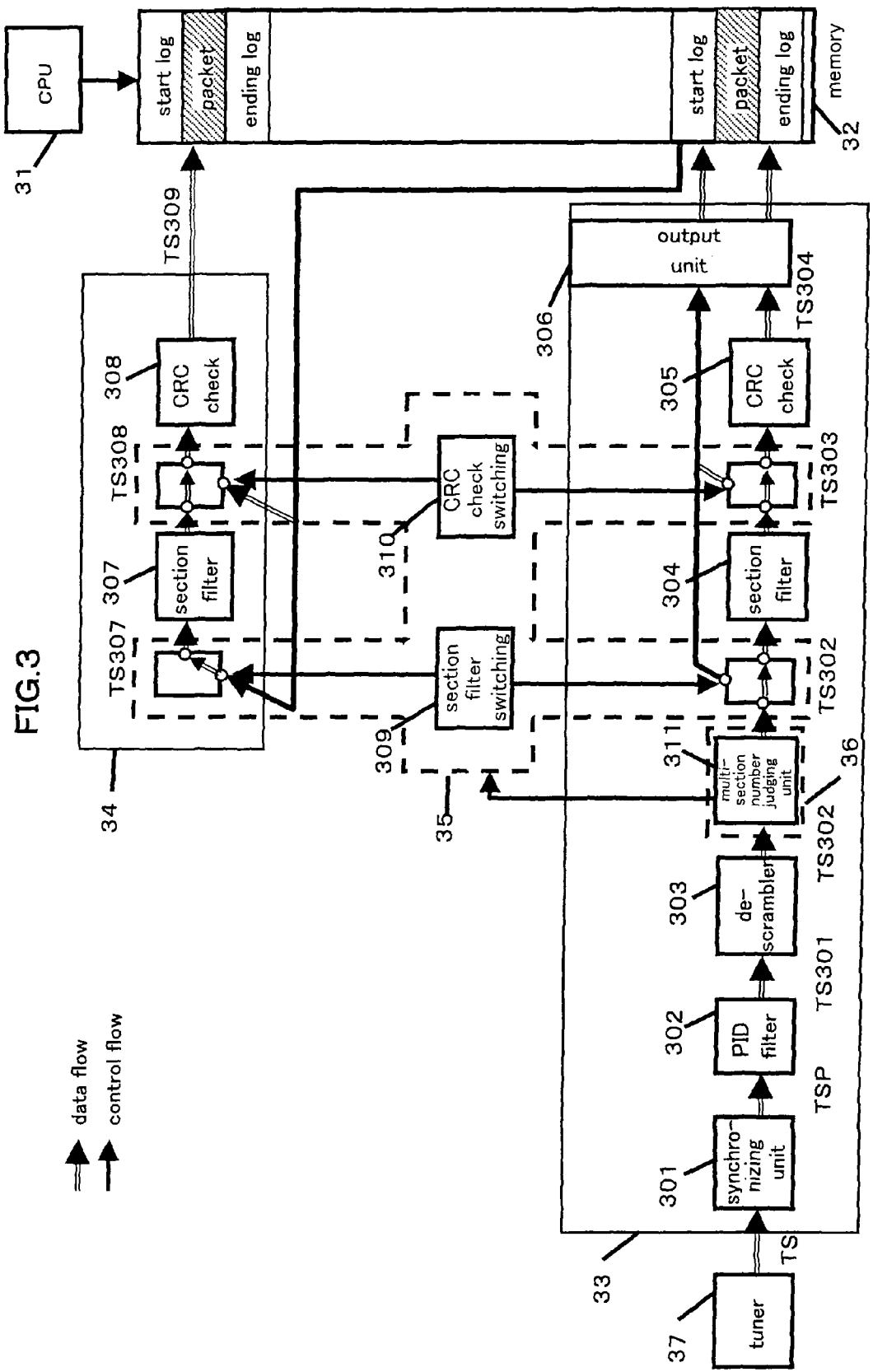
FIG. 3 is a block diagram illustrating an entire constitution of a stream processing apparatus according to a second preferred embodiment of the present invention.
Figure 4:
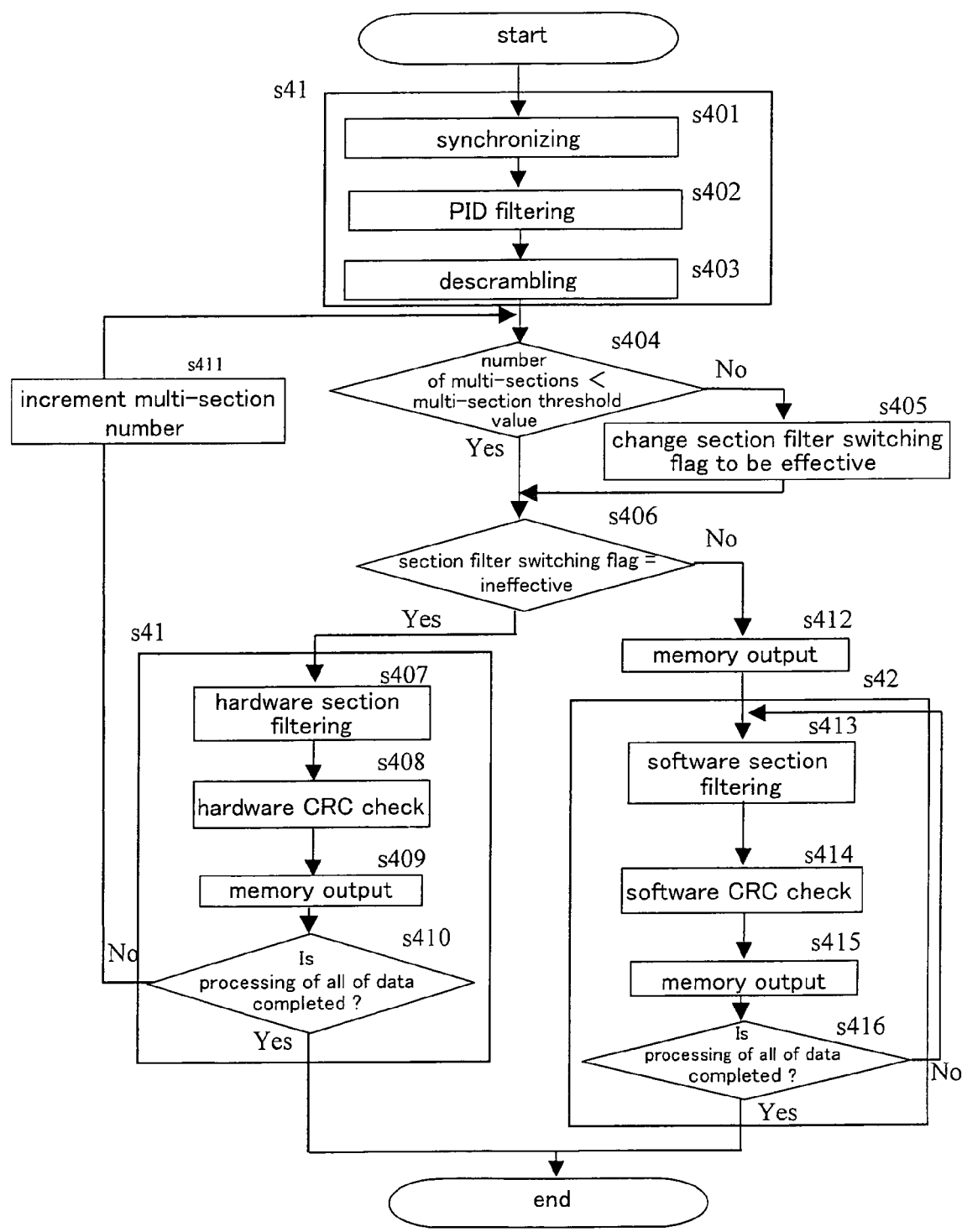
FIG. 4 is a flow chart according to the second preferred embodiment.
Figure 5:
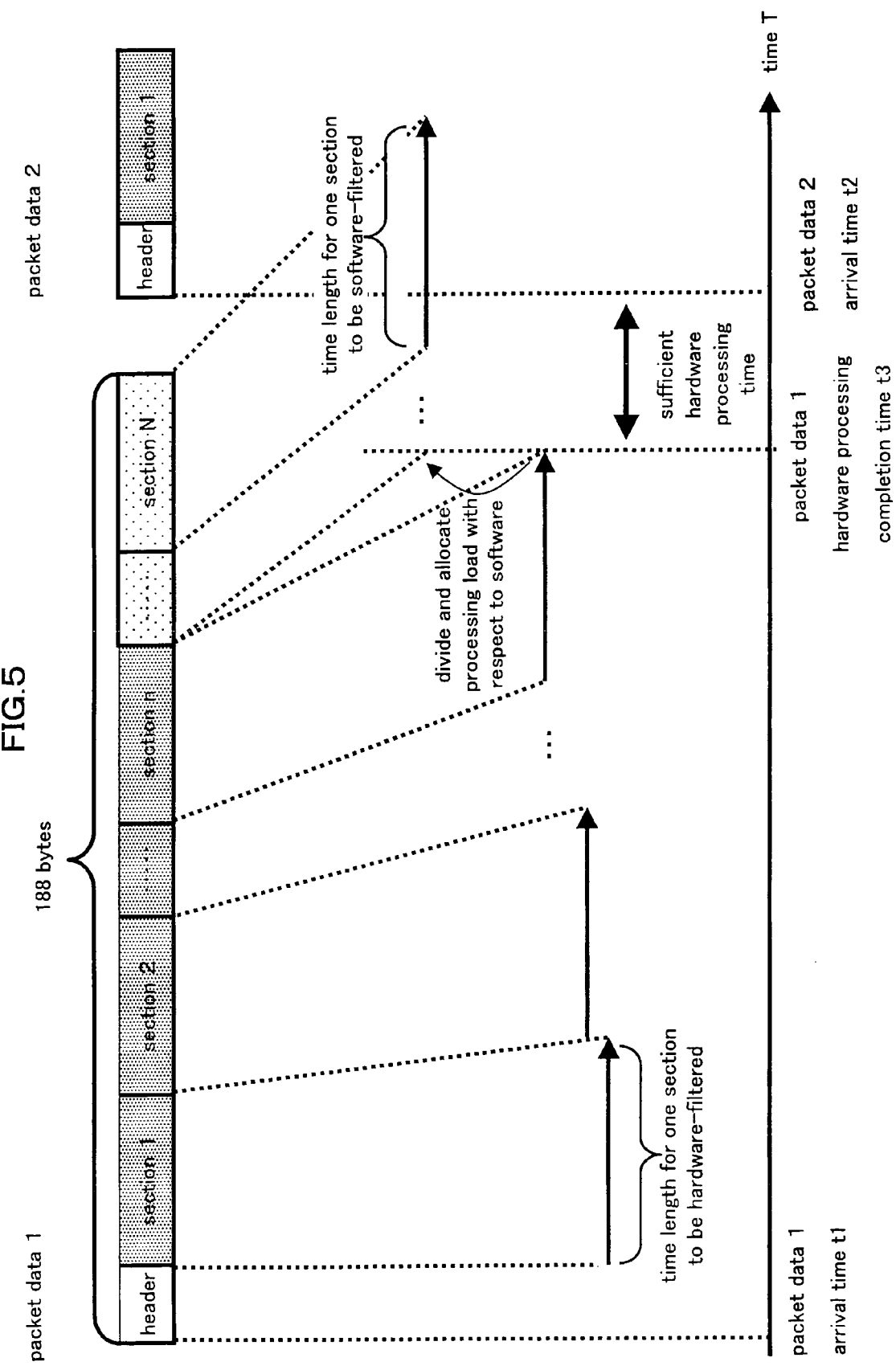
FIG. 5 is a processing-time correlation chart in the case of a multi-section according to the second preferred embodiment.

Referring to FIGS. 3 through 5, a second preferred embodiment of the present invention is described. According to the second preferred embodiment, the hardware transport stream separating device comprises a multi-section number judging unit 311 as a state judging device 36. The multi-section number judging unit 311 counts number N of the multi-sections multiplexed in one TSP of TS302 outputted from a descrambler 303 from the head of the payload and outputs a processing switching control signal to a processing switching device 35 so that a section larger than a multi-section threshold value n set by a CPU (processor) 31 and thereafter are processed on the software. The switching device 35 receives the processing switching control signal and correspondingly changes the section filter switching flag to be effective to thereby change a current setting so that a software section filter (section filtering section) 307 and a software CRC check (CRC checking unit) 308 are executed.

When "0" is set to the multi-section threshold value, such a control operation that all of the sections are processed on the software can be executed. Alternatively, when the number of the multi-sections is previously counted and the TSP larger than the multi-section threshold value is detected, such a control operation that all of the payloads are processed on the software can be also executed.

FIG. 4 shows a processing flow chart.

In the second preferred embodiment is described a case in which a multi-section number judging step s404 is additionally provided as a state judging step s44 based on the flow chart of FIG. 2. The multi-section number judging step 404 compares the number of the multi-sections counted in a multi-section number incrementing step s411 and the multi-section threshold value set by the CPU 31 to each other every time when a section filtering step s407, a CRC checking step s408 and a memory output step s409 of a hardware transport separating step s41 are executed. Then, the multi-section number judging step 404 changes the section filter switching flag to be effective in a step s405 when the number of the multi-sections exceeds the other to thereby switch the processing so as to proceed to a software transport separating step s42. When the section filter switching flag is ineffective in a section filter switching step s406, the step s407 of the hardware transport separating step s41 is carried out, while a step s412 is carried out when the flag is effective. The step s407 is the section filtering step, in which the section is retrieved from the inputted from the TSP and the header part of the section is filtered so as to retrieve the necessary section and discard the unnecessary section, moves on to the step s408. In the step s408 as the CRC checking step, the CRC error of the section is checked. Then, the s409 is carried out next.

In the step s409 as the memory output step, the data processed in the steps up to the step s408 is outputted to a memory 32 accessible by the CPU 31. A step s410 confirms if the processing of all of the sections in the inputted TSP is completed, and terminates the processing of the relevant TSP upon the confirmation of the completion. The step s410 proceeds to the step s411 in the presence of any unprocessed data. In the step s411, the number of the sections processed in the step s41 is incremented as the number of the multi-sections as described earlier, and the step s404 is then carried out. The step s412 is the memory output step in which the rest of the data processed in the step s41 is outputted to the memory 32 accessible by the CPU 31, and a step s413 of the software transport separating step s42 is then carried out. The step s413 is the section filtering step, in which the section is retrieved from the inputted data and the header part of the section is filtered so as to retrieve the necessary section and discard the unnecessary section. Then, a step s414 is carried out.

The step s414 is the CRC checking step for checking the CRC error of the section, and a step s415 is carried out next. The step s415 is the memory output step for outputting the data processed in the steps up to the step s414 to the memory (memorizing device) 32 accessible by the CPU 31, and proceeds to a step s416. The step s416 confirms if the processing of all of the sections in the inputted data is completed. The step s416 terminates the processing of the relevant data upon the confirmation of the completion, while returning to the step s413 in the presence of any unprocessed data to continue the processing. Further, because of the possibility that the stored sections extend across more than one TSP, an additional step in order to deal with such a constitution may possibly be provided.

When the state judging step is thus additionally provided, the originally hardware-executed transport stream separating step can be dynamically switched to be executed on the software depending on the circumstances.

FIG. 5 shows a processing-time correlation in the case of processing the N number of multi-sections when n is set to the multi-section threshold value of the multi-section number judging device 36 by the CPU 31 in the present invention. The processing load is divided in such manner that the sections up to a section n are processed by a hardware transport separating device 33, while the sections n through N are processed by a software transport separating device 34. Such a constitution can prevent a time length for the hardware to complete the entire section filtering from exceeding a time length for the TSP to be processed next to arrive.

Third Preferred Embodiment

Figure 6:
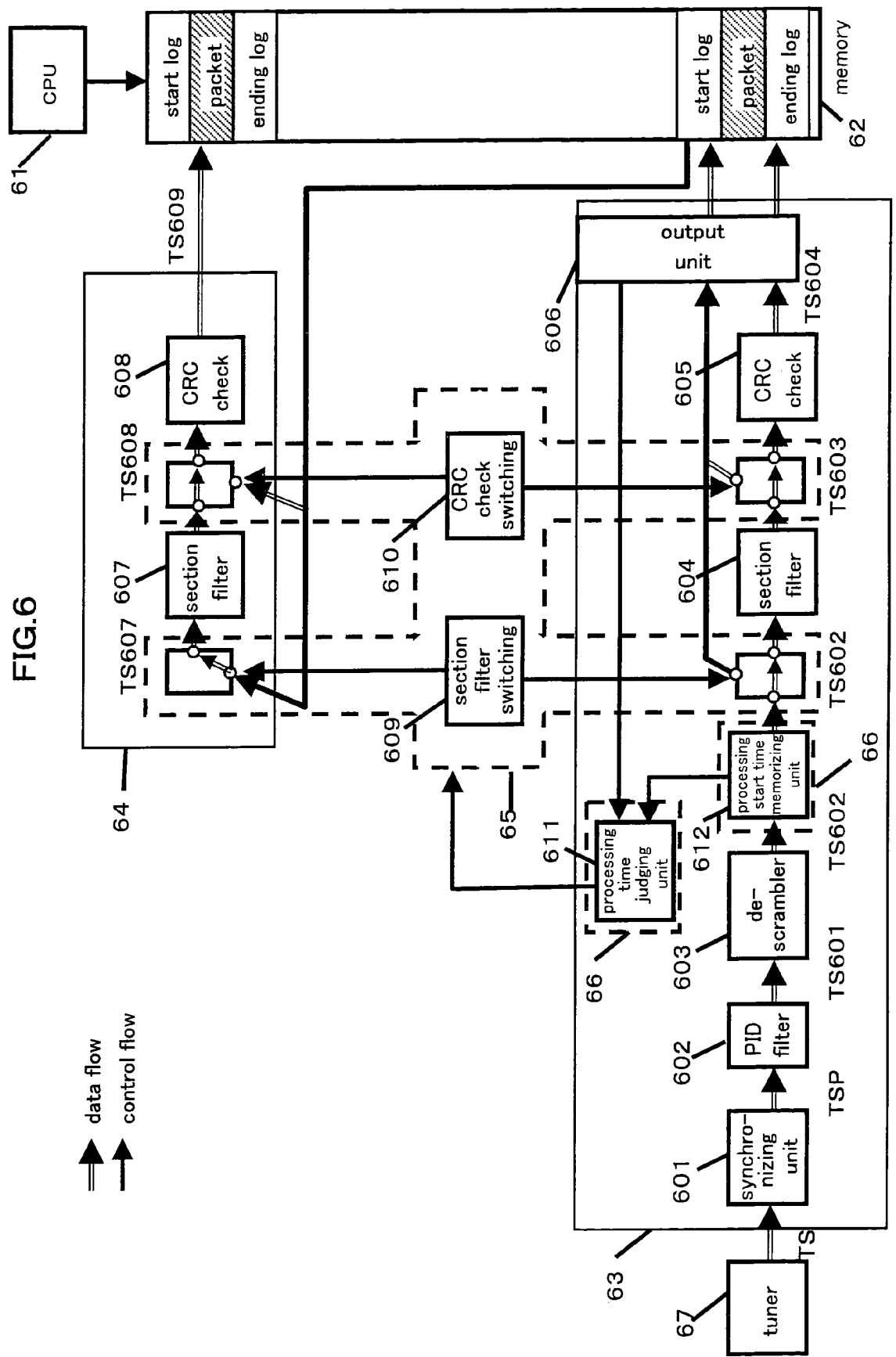
FIG. 6 is a block diagram illustrating an entire constitution of a stream processing apparatus according to a third preferred embodiment of the present invention.
Figure 7:
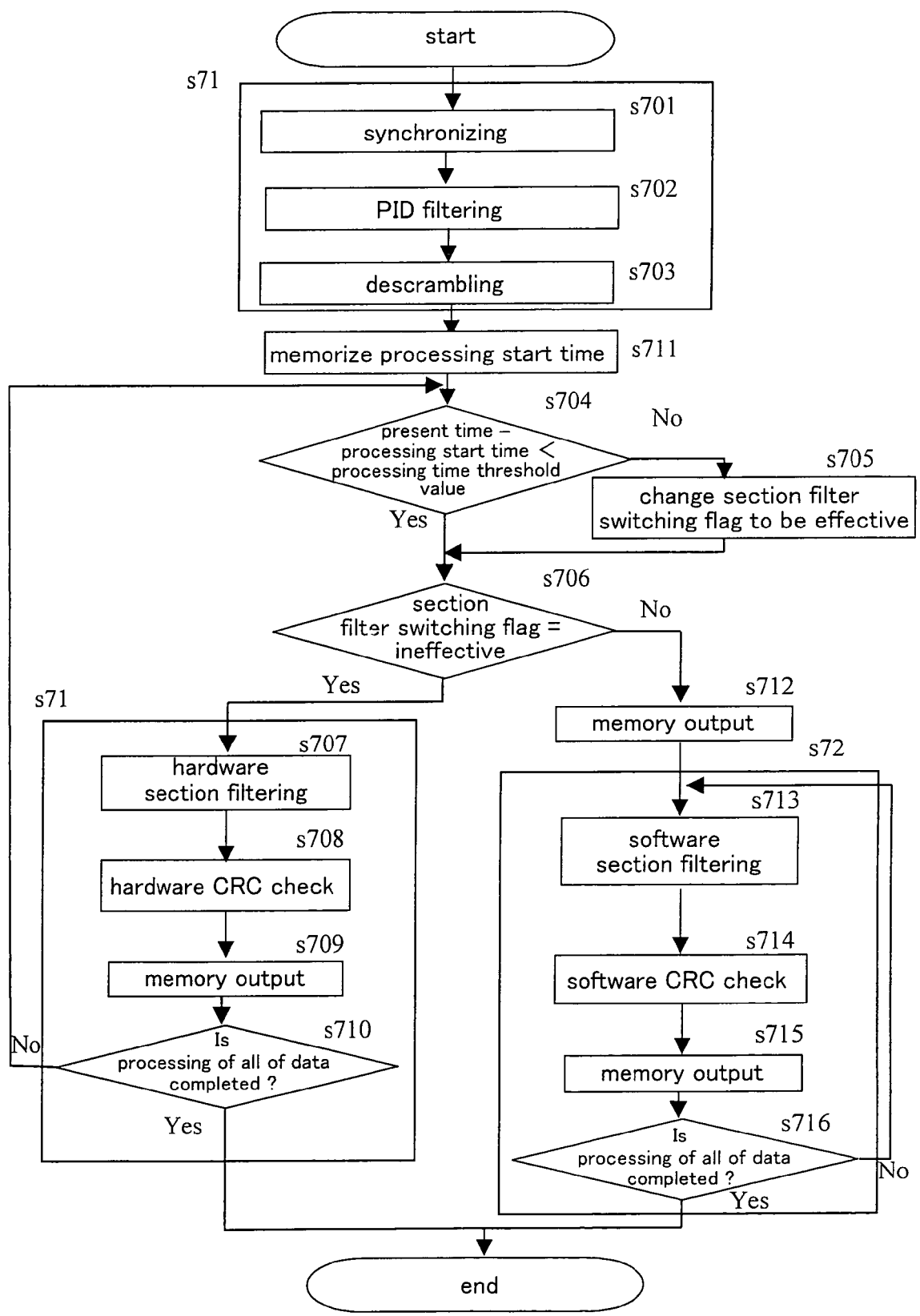
FIG. 7 is a flow chart according to the third preferred embodiment.

A third preferred embodiment of the present invention is described referring to FIGS. 6 and 7. Below is described, referring to FIG. 6, a case in which a processing time judging unit 611 is additionally provided as a state judging device 66 in the hardware transport stream processing apparatus 13 of the transport stream processing apparatus shown in FIG. 1.

The processing time judging unit 611 measures a time point t1 between a time point when the processing of TSP602 outputted from a descrambler 603 starts and present, and outputs the processing switching control signal to a processing switching device 65 when the measured time point exceeds a processing-time threshold value set by a CPU 61. A processing switching section 65 receives the processing switching control signal and correspondingly changes the section filter switching flag to be effective to thereby change a current setting so that a section filter 607 and a CRC check 608 using the software are executed. Such a control operation that all of the payload are processed by the software can be executed when "0" is set to the processing-time threshold value.

FIG. 7 shows a processing flow chart.

In the third preferred embodiment is described a case in which a processing-time judging step s704 is additionally provided as a state judging step s74 based on the flow chart of FIG. 2. A step s711 terminates the hardware transport separating step up to a step s703 and memorizes a processing start time when the next processing starts. The processing-time judging step s704 compares the processing-time threshold value set by the CPU 61 and a difference between a present time and the processing start time to each other. Then, processing-time judging step s704 changes the section filter switching flag to be effective in s705 when the difference between the present time and the processing start time exceeds the other to thereby switch the processing so as to proceed to a software transport separating step s72. When the section filter switching flag is judged to be ineffective in a section filter switching step s706, a step s707 of a hardware transport separating step s71 is carried out next, while a step s712 is carried out next when the flag is effective. The step s707 is the section filtering step, in which the section is retrieved from the inputted TSP and the header part of the section is filtered so as to retrieve the necessary section and discard the unnecessary section, proceeds to a step s708. The step s708 is the CRC checking step, in which the CRC error of the section is checked, proceeds to a step s709.

The step s709 is the memory output step, in which the data processed in the steps up to the step s708 is outputted to a memory 62 accessible by the CPU 61. A step s710 confirms if the processing of all of the sections in the inputted TSP is completed. Upon the confirmation of the completion, the processing with respect to the relevant TSP is terminated. In the presence of any unprocessed data, the step s704 is carried out again so that the processing is continued. A step s712 is the memory output step, in which the rest of the data processed in the step s71 is outputted to the memory 62 accessible by the CPU 61. Then, a step of s713 of the software transport separating step s72 is carried out. The step s713 is the section filtering step, in which the section is retrieved form the inputted data and the header part of the section is filtered so as to retrieve the necessary section and discard the unnecessary section. Then, a step s714 follows. The step s714 is the CRC checking step, in which the CRC error of the section is checked, and a step s715 follows.

The step s715 is the memory output step, in which the data processed in the steps up to the step s714 is outputted to the memory 62 accessible by the CPU 61, proceeds to a step s716. The step s716 confirms if the processing of all of the sections in the inputted data is completed. Upon the confirmation of the completion, the processing with respect to the relevant data is terminated, while the step s713 is repeated in the presence of any unprocessed data so that the processing is continued.

Further, because of the possibility that the stored sections extend across more than one TSP, an additional step in order to deal with such a constitution may possibly be provided When the state judging step is thus additionally provided, the originally hardware-executed transport stream separating step can be dynamically switched to be processed on the software.

Fourth Preferred Embodiment

Figure 8:
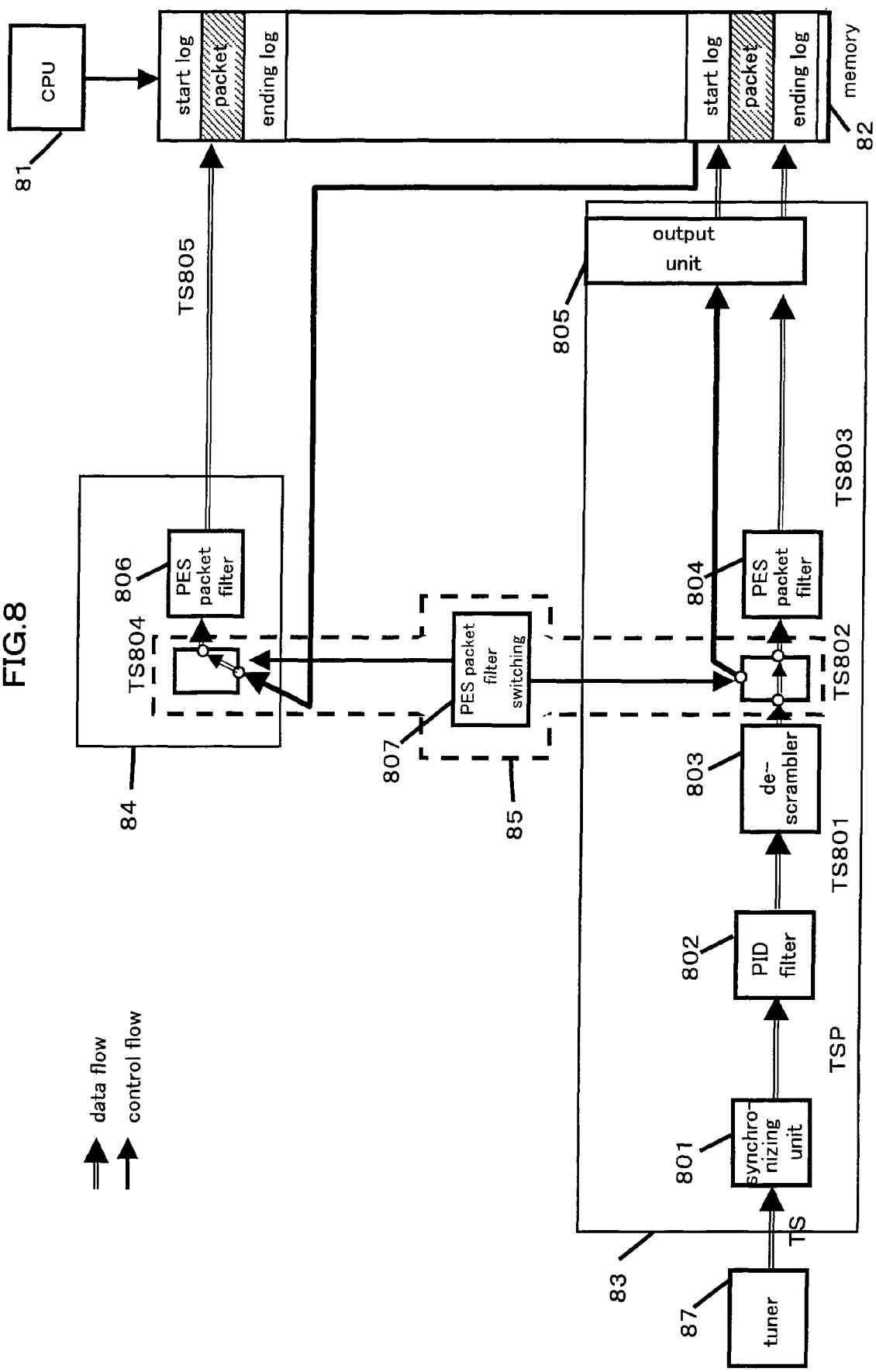
FIG. 8 is a block diagram illustrating an entire constitution of a stream processing apparatus according to a fourth preferred embodiment of the present invention.
Figure 9:
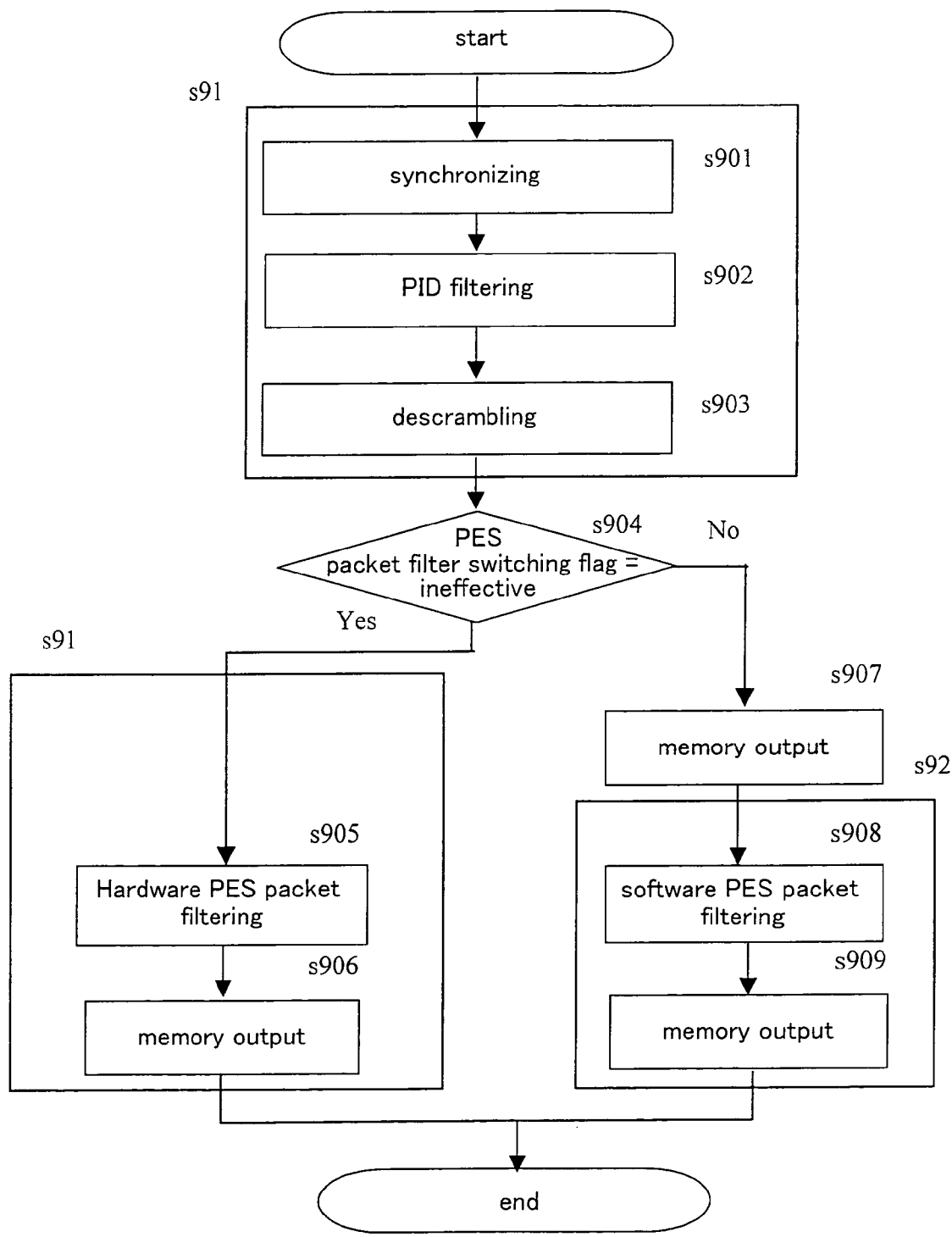
FIG. 9 is a flow chart according to the fourth preferred embodiment.

A fourth preferred embodiment of the present invention is described referring to FIGS. 8 and 9. In the fourth preferred embodiment, a PES packet filter switching flag for switching to and from the hardware processing and the software processing of the PES packet filter is provided in a processing switching device 85, and a PES packet filter 806 is provided as a software transport stream separating device 84. The PES packet filter switching flag can be set by a CPU 81.

A hardware transport stream separating device 83 comprises a synchronizing unit 801, a PID filter 802, a descrambler 803, a section filter 804, a CRC checking unit 805 and an output unit 806. The synchronizing unit 801 detects the leading data from the inputted TS to thereby extract and output the TSP. The PID filter 802 outputs only the necessary TSP as TS801 and discards the unnecessary TSP based on the PID of the TSP inputted from the synchronizing unit 801. The descrambler 803 judges the transport scramble control (TSC) of the TS801 inputted from the PID filter 802, and descrambles the data if the data is scrambled and outputs it as TS802, while directly outputting the data as the TS802 without any processing if the data is not scrambled.

Hereinafter, the processing switchover is executed in response to the state of the PES packet filter switching flag.

When the PES packet filter switching flag is ineffective, the PES packet filtering is executed by means of the hardware as in the conventional method. The PES packet filter 804 retrieves the PES packet from the inputted TSP and filters the header part of the TES packet. As a result of the filtering process, the PES packet filter 804 appends a PES packet start log to the necessary PES packet and outputs it as TS103, while discarding the unnecessary PES packet. The PES packet filter 804 appends a PES packet filtering through (passing) log to TS102 instead of hardware-executing the PES packet filtering when the PES packet filter switching flag is effective and outputs it to a memory 82 from the output unit 805.

Next, an operation of the CPU 81 with respect to the data stored in the memory 82 is described.

The CPU 81, in the case of processing the packet stored in the memory 82, first reads the logs appended to the top and bottom of the packet stored in the memory 82, and the processing switchover is thereby executed based on the state of the logs. As an alternative constitution, the processing switchover may be executed in response to the PES packet filter switching flag of the processing switching device 85 instead of the log. In the fourth preferred embodiment, the processing switchover based on the log is described.

In the case in which the read log includes the PES packet start log, the PES packet is processed in the same manner as in the conventional technology. When the read log is the PES packet filtering through (passing) log, the PES packet filtering using the software is executed. When the PES packet filtering through (passing) log is confirmed, the software transport separating device 84 reads the written packet from the memory 82 and inputs it as TS804 to the PES packet filter 806. The PES packet filter 806 retrieves the PES packet from the TS804 and filters the header part of the PES packet to thereby output only the necessary PES packet as TS805 and discard the unnecessary PES packet.

Because the TS804 constitutes (all or a part of) the payload part of the TSP, the software PES packet filter 806 continues its processing until the output of all of the PES packets in the written payload part as the TS805 is completed. As an indicator for continuing the processing, the information on the length of the written payload (byte number) may possibly be appended to the PES packet filtering through (passing) log.

The TS804 constitutes the (all or a part of) payload part of the TSP, and the PES packets stored therein may extend across more than one TSP. Because of that, the PF (Pointer Field) information, PUSI information and the like may possibly be supplied to the PES packet filtering through (passing) log. At that time, a memory region as a destination of the output of the PES packet filter 804 may be the same as or may be different to a memory region as an origin of the input of the PES packet filter 806.

FIG. 9 shows a processing flow chart.

In the fourth preferred embodiment is described a case in which a PES packet filter switching step s904 for switching to and from the hardware processing and the software processing of the PES packet filter is provided as a processing switching step s93. As a hardware transport stream separating step s91, a synchronizing step s901, a PID filtering step s902, a descrambling step s903 and a PES packet filtering step s905 are provided. As a software transport stream separating step s92, a PES packet filtering step s907 is provided.

Below is given a description based on the processing flow.

In the step s901 as the synchronizing step, the leading data is detected form the inputted TS and the TSP extracted. In the next step s902 as the PID filtering step, only the necessary TSP is retrieved, while the unnecessary TSP is discarded based on the PID of the inputted TSP. In the next step s903 as the descrambling step, the TSC of the TSP is judged, and the data is descrambled if the data is scrambled, while the step s904 is immediately carried out if the data is not scrambled.

When the PES packet filter switching flag is ineffective in the PES packet filter switching step s904, the step s905 of the hardware transport separating step s91 follows, while the step s907 follows when the flag is effective.

The step s905 is the PES packet filtering step, in which the PES packet is retrieved from the inputted TSP and the header part of the PES packet is filtered so that the necessary PES packet is retrieved and the unnecessary PES packet is discarded. In the next step s906 as the memory output step, the data processed in the steps up to the step s905 is outputted to the memory 82 accessible by the CPU 81. The step s907 is the memory output step, in which the data processed in the steps up to the step s903 is outputted to the memory 82 accessible by the CPU 81. Then, the processing proceeds to a step s908 of the software transport separating step s92.

The step s908 is the PES packet filtering step, in which the PES packet is retrieved from the inputted TSP and the header part of the PES packet is filtered so that the necessary PES packet is retrieved and the unnecessary PES packet is discarded. In the next step s909 as the memory output step, the data processed in the steps up to the step s908 is outputted to the memory 82 accessible by the CPU 81.

When the transport stream separating process, which was not executed on the hardware, is executed on the software, the PES packet written in the memory can be processed in the same manner as in the conventional technology.

Fifth Preferred Embodiment

Figure 10:
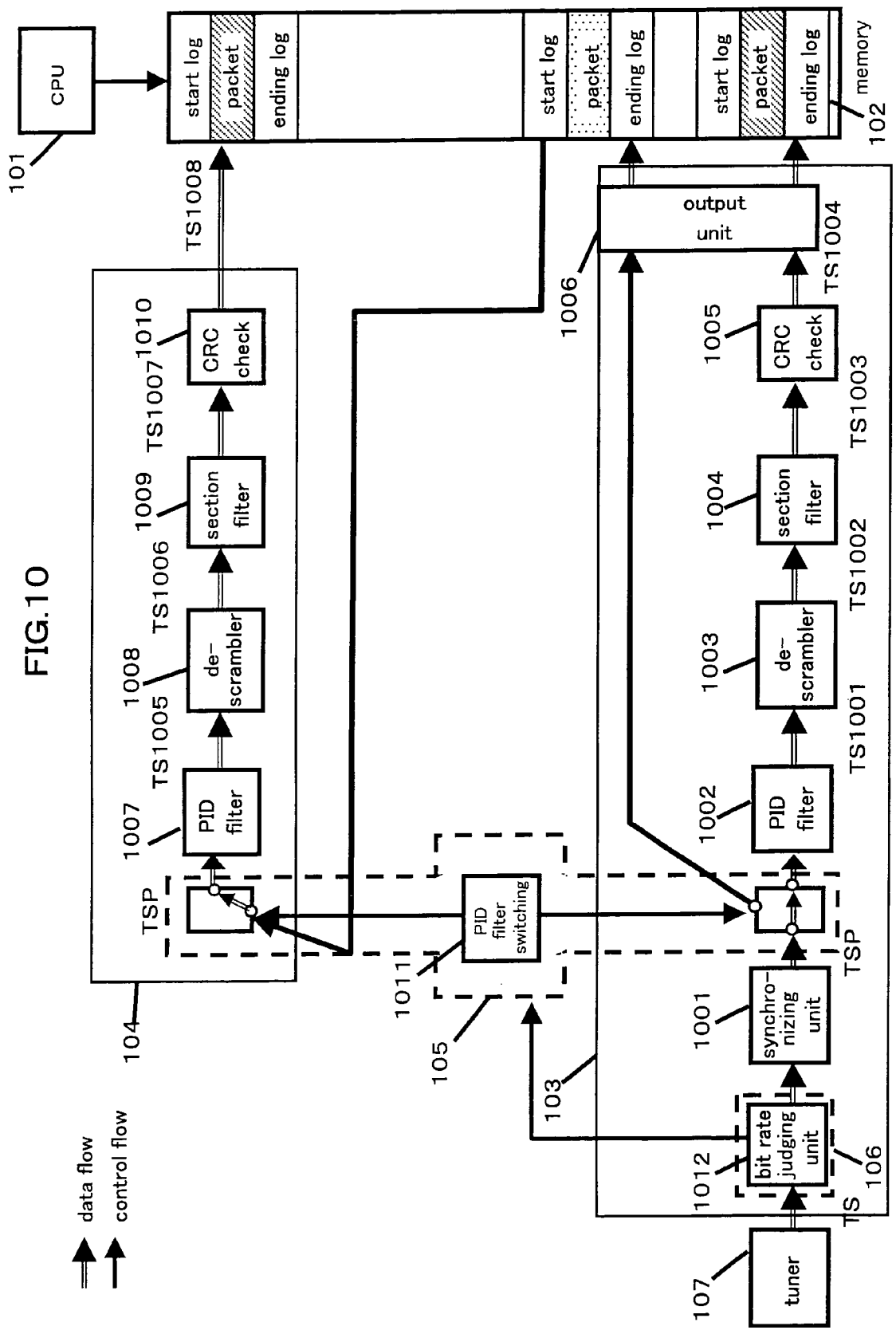
FIG. 10 is a block diagram illustrating an entire constitution of a stream processing apparatus according to a fifth preferred embodiment of the present invention.
Figure 11:
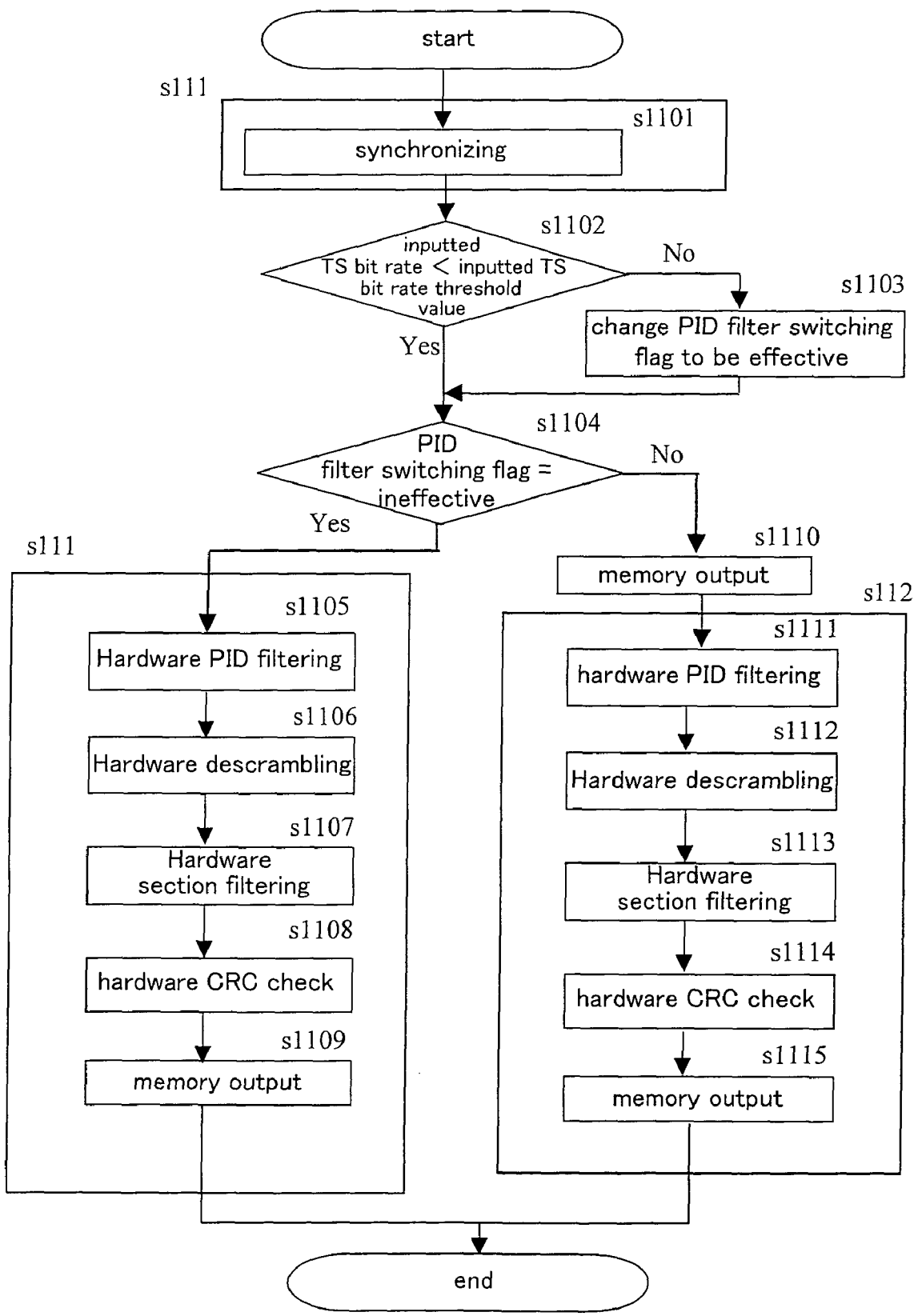
FIG. 11 is a flow chart according to the fifth preferred embodiment.

A fifth preferred embodiment 5 of the present invention is described referring to FIGS. 10 and 11. FIG. 10 is a block diagram illustrating a constitution relating to data reception in a digital broadcast receiver according to the fifth preferred embodiment. In the digital broadcast receiver, a CPU 101 as a processor, a memory (memorizing device) 102 accessible by software operating on the CPU 101, a tuner 107 for frequency-selecting a targeted carrier wave from received electric waves and demodulating and error-correcting the carrier wave, the tuner 17 further selecting a transport stream from the carrier wave and outputting the transport stream, and a transport stream processing apparatus are mainly responsible for the data reception. Single-lined arrows show a control flow, while double-lined arrows shows a data flow. In FIG. 10, the transport stream processing apparatus comprises a hardware transport stream separating device 103, a software transport stream separating device 104, a processing switching device 105 for switching to and from the hardware and the software in the transport separating process and a state judging device 106.

The software transport stream separating device 104 comprises a PID filter 1007, a descrambler 1008, a section filter 1009, and a CRC checking unit 1010.

Further, the processing switching device 105 is provided with a PID filtering switching flag for switching to and from the hardware processing and the software processing of the PID filter, the PID filtering switching flag being settable by the CPU 101.

As the state judging device in the hardware transport stream separating device 13, a bit rate judging unit 1012 is provided. In the description of the present embodiment below is referred to a case in which a temporary memory TSP number judging unit 1013, a multi-TS number judging unit 1014, a CPU operating ratio judging unit 1015 or a PID non-equality judging unit 1016 as a state judging unit 106 is provided as the state judging device 106.

The hardware transport stream separating device 103 comprises a synchronizing unit 1001, a PID filter 1002, a descrambler 1003, a section filter 1004, a CRC check 1005 and an output unit 1006.

The synchronizing unit 1001 detects the leading data from the inputted TS, and extracts and outputs the TSP.

Hereinafter, the processing switchover is executed based on the state of the PID filter switching flag.

When the PID filter switching flag is ineffective, the PID filter 1002 outputs only the necessary TSP as TS1001 and discards the unnecessary TSP based on the PID of the TS inputted from the synchronizing unit 1001. The descrambler 1003 judges the TSC of the TS1001 inputted from the PID filter 1002, and descrambles the data if the data is scrambled and outputs it as TS1002. When the data is not scrambled, the data is immediately outputted as the TS1002 without any processing.

The section filter 1004 retrieves the section from the inputted TSP and filters the header part of the section. The section filter 1004, as a result of the filtering process, supplies the section start log to the necessary section and outputs it as TS1003, while discarding the unnecessary section.

The CRC checking unit 1005 checks the CRC error of the section in the TS1002 outputted from the section filter 1004 and supplies the CRC check result log thereto and outputs it as TS1004 to a memory 102 from the output unit 1006. However, the section having no CRC (section whose SSI (Section Syntax Indicator)=0) is not subjected to the CRC check and directly outputted. Such a constitution that the section is discarded when the CRC check result is NG is possibly adopted.

When the PID filter switching flag is effective, the hardware transport separating process is not executed, while the TSP inputted from the synchronizing unit 1001 is outputted to the memory 102 from the output unit 1006.

The software transport separating device 104 reads the written packet form the memory 102 and inputs it as the TSP to the PID filter 1007. The PID filter 1007 outputs only the necessary TSP as TS1005 and discards the unnecessary TSP based on the PID of the inputted TSP. The descrambler 1008 judges the TSC of the TS1005 inputted from the PID filter 1007, and descrambles the data if the data is scrambled and outputs the descrambled data as TS1006, while directly outputting the non-scrambled data as the TS1006 without any processing.

The section filter 1009 retrieves the section from the inputted TSP and filters the header part of the section, as a result of which the section filter 1009 outputs the necessary section as TS1007 and discards the unnecessary section.

The CRC checking unit 1010 checks the CRC error of the section in the TS1007 outputted from the section filter 1009, and supplies the CRC check result log to the section and outputs it as TS1008 to the memory 102. However, the section having no CRC (section whose SSI (Section Syntax Indicator)=0) is not subjected to the CRC check and directly outputted. Such a constitution that the section is discarded when the CRC check result is NG is possibly adopted. A memory region as a destination of the output from the CRC checking unit 1010 may be or may not be the same as a memory region as a destination of the output of the output unit 1006.

As described, the originally hardware-executed transport stream separating step can be executed on the software, and the section to be written in the memory can be processed in the same manner as in the conventional technology.

Below is described a case in which the bit rate judging unit 1012 is provided as the state judging device 106 so as to switch the transport stream separating step.

The bit rate judging unit 1012 judges a bit rate of the TS inputted to the synchronizing unit 1001, and outputs the processing switching control signal to the processing switching device 105 so as to execute the transport separating process on the software when the judged bit rate exceeds a bit rate threshold value set by the CPU 101.

The processing switching device 105 receives the processing switching control signal and correspondingly changes the PID filter switching flag to be effective to thereby change a current setting so as to execute the transport separating process by means of the software.

FIG. 11 shows a processing flow chart.

In the fifth preferred embodiment is described a case in which a PID filtering switching step s1104 for switching to and from the processing respectively executed after the PID filtering step in the sill using the hardware and after the PID filtering step in the s112 using the software is included as a switching step s113 and a bit rate judging step s1102 is included as a state judging step s114.

As a hardware transport stream separating step s111, a synchronizing step s1101, a PID filtering step s1105, a descrambling step s1106, a section filtering step s1107 and a CRC checking step s1108 are included.

As a software transport stream separating step s112, a PID filtering step s1111, a descrambling step s1112, a section filtering step s1113 and a CRC checking step s1114 are included.

Below is given a description based on the processing flow.

The step s1101 is the synchronizing step, in which the leading data is detected from the inputted TS and the TSP is extracted. Then, the step s1102 is carried out next.

The bit rate judging step s1102 judges the bit rate of the TS inputted in the synchronizing step s1101, and changes the PID filter switching flag to be effective in a step s1103 when the judged bit rate exceeds the bit rate threshold value set by the CPU 101, and then, executes the processing switchover so as to proceed to the software transport separating step s112.

When the PID filter switching flag is ineffective in the PID filtering switching step s1104, the processing proceeds to s1105 of the hardware transport separating step s111, while proceeding to a step s1110 when the flag is effective.

The step s1105 is the PID filtering step, in which only the necessary TSP is retrieved and the unnecessary TSP is discarded based on the PID of the inputted TSP, proceeds to the step s1106. In the step s1106 as the descrambling step, the TSC of the TSP is judged and the data is descrambled in the case of the scrambled data, while the step s1107 is immediately carried out in the case of the non-scrambled data.

The step s1107 is the section filtering step, in which the section is retrieved from the inputted TSP and the header part of the section is filtered so as to retrieve the necessary section and discard the unnecessary section, proceeds to the step s1108. The step s1108 is the CRC checking step, in which the CRC error of the section is checked, proceeds to a step s1109. The step s1109 is the memory output step, in which the data processed in the steps up to the step s1108 is outputted to the memory 102 accessible by the CPU 101.

Next is described a processing in the case of advancing to the software transport separating step s112. The step s1110 is the memory output step, in which the data processed in the steps up to the step s1101 is outputted to the memory accessible by the CPU, is followed by the step s1111 of the software transport separating step s112. The step s1111 is the PID filtering step, in which only the necessary TSP is retrieved and the unnecessary TSP is discarded based on the PID of the inputted TSP, is followed by the step s1112.

In the step s1112 as the descrambling step, the TSC of the TSP is judged, and the data is descrambled in the case of the scrambled data, while the next step s1113 is immediately carried out in the case of the non-scrambled data.

The step s1113 is the section filtering step, in which the sections are retrieved from the inputted TSP and the header parts of the sections are filtered so as to retrieve the necessary section and discard the unnecessary section, is followed by the step s1114.

The step s1114 is the CRC checking step, in which the CRC error of the section is checked, is followed by the step s1115. The step s1115 is the memory output step, in which the data processed in the steps up to the step s1114 is outputted to the memory 102 accessible by the CPU 101.

When the bit rate threshold value settable by the CPU 101 is set to a maximum input TS bit rate value processable by the hardware transport stream separating device 103, the transport separating process is switched to the software transport stream separating device 104 every time when the unprocessable TS is inputted to the hardware transport stream separating device 103. Thereby, the system can be prevented from halting, and the fail-soft transport stream processing apparatus can be provided.

In the description of the fifth preferred embodiment, the section filtering and the CRC check are executed subsequent to the descrambling step, however, the same effect can be achieved when the PES packet filtering is alternatively executed.

Sixth Preferred Embodiment

Figure 12:
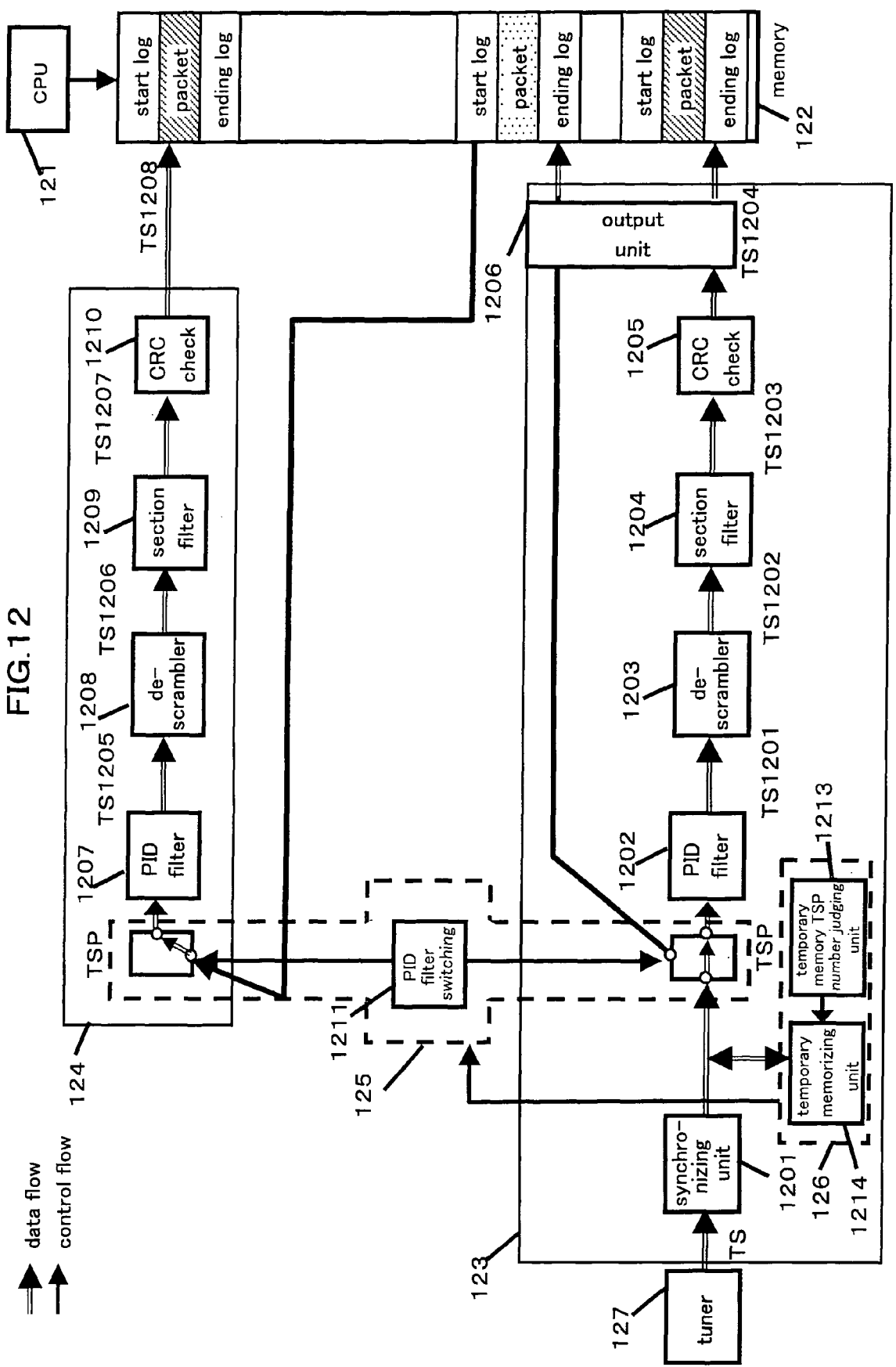
FIG. 12 is a block diagram illustrating an entire constitution of a stream processing apparatus according to a sixth preferred embodiment of the present invention.
Figure 13:
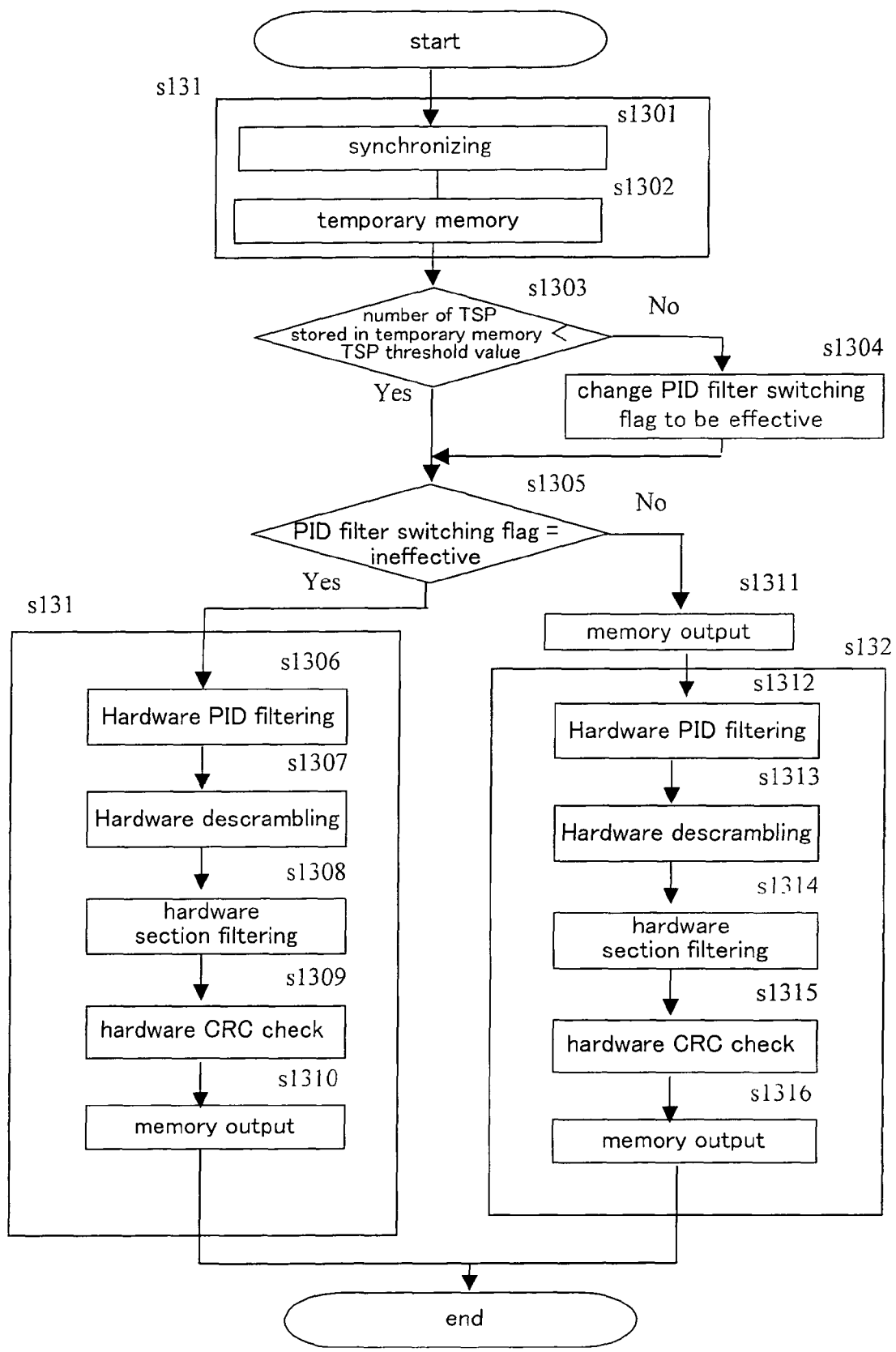
FIG. 13 is a flow chart according to the sixth preferred embodiment.

A sixth preferred embodiment of the present invention is described referring to FIGS. 12 and 13. In the sixth preferred embodiment, a temporary memory TSP number judging unit 1213 and a temporary memory section 1214 are provided as a state judging device 106. The temporary memory TSP number judging unit 1213 judges the number of the TSP memorized in the temporary memory section 1214 for temporarily memorizing the TSP outputted from a synchronizing unit 1201, and outputs the processing switching control signal to a processing switching device 125 so that the transport separating process is executed on the software when the judged number of the TSP exceeds a TSP threshold value set by a CPU 121. The switching device 125 receives the processing switching control signal and correspondingly changes the PID filter switching flag to be effective to thereby change a current setting so as to execute the software transport separating process.

FIG. 13 shows a processing flow chart.

In the fifth preferred embodiment is described a case in which a PID filtering switching step s1305 for switching to and from the processing respectively executed after the PID filtering step in the s131 using the hardware and after the PID filtering step in the s132 using the software is included as a switching step s113 and a TSP number judging step s1303 is included as a state judging step s134.

As a hardware transport stream separating step s131, a synchronizing step s1301, a temporary memorizing step s1302, a PID filtering step s1306, a descrambling step s1307, a section filtering step s1308 and a CRC checking step s1309 are included.

As a software transport stream separating step s132, a PID filtering step s1312, a descrambling step s1313, a section filtering step s1314 and a CRC checking step s1315 are included.

Below is given a description based on the processing flow.

The step s1301 is the synchronizing step, in which the leading data is detected from the inputted TS and the TSP is extracted, proceeds to the step s1302. The step s1032 is the temporary memorizing step, in which the TSP outputted in the synchronizing step s1301 is temporarily memorized.

The TSP number judging step s1303 judges the number of the TSP memorized in the temporary memorizing step 1302 for temporarily memorizing the TSP outputted in the synchronizing step s1301, and changes the PID filter switching flag to be effective in the step s1304 when the judged number of the TSP is larger than the TSP threshold value set by the CPU to thereby execute the processing switchover so that the processing of the relevant TSP proceeds to the software transport separating step s132. When the PID filter switching flag is ineffective in the PID filtering switching step s1305, the step s1306 of the hardware transport separating step s131 is carried out, while a step s1311 is carried out when the flag is effective.

The step s1306 is the PID filtering step, in which only the necessary TSP is retrieved and the unnecessary TSP is discarded based on the PID of the inputted TSP, is followed by the step s1307.

The step s1307 is the descrambling step, in which the TSC (Transport Scramble Control) of the TSP is judged, and the data is descrambled in the case of the scrambled data. The step s1307 immediately proceeds to the step s1308 in the case of the non-scrambled data.

The step s1308 is the section filtering step, in which the section is retrieved from the inputted TSP and the header part of the sections is filtered so as to retrieve the necessary section and discard the unnecessary section, is followed by the step s1309. The steps 1309 is the CRC checking step, in which the CRC error of the section is checked, is followed by a step s1310.

The step s1310 is the memory output step, in which the data processed in the steps up to the step s1309 is outputted to a memory 122 accessible by the CPU 121.

Next is described a case in which the software transport separating step s132 is carried out. A step s1311 is the memory output step, in which the data processed in the steps up to the step s1302 is outputted to the memory 122 accessible by the CPU 121, is followed by the step s1312 of the software transport separating step s132. The step s1312 is the PID filtering step, in which only the necessary TSP is retrieved and the unnecessary TSP is discarded based on the PID of the inputted TSP, is followed by the step s1313.

In the step s1313 as the descrambling step, the TSC (Transport Scramble Control) of the TSP is judged, and the data is descrambled in the case of the scrambled data. The step s1313 immediately proceeds to the step s1314 in the case of the non-scrambled data.

The step s1314 is the section filtering step, in which the section is retrieved from the inputted TSP and the header part of the section is filtered so as to retrieve the necessary section and discard the unnecessary section, is followed by the step s1315. The step s1315 is the CRC checking step, in which the CRC error of the section is checked, is followed by a step s1316.

The step s1316 is the memory output step, in which the data processed in the steps up to the step s1315 is outputted to the memory 122 accessible by the CPU 121.

When the TSP threshold value settable by the CPU 121 is set to a maximum TSP value memorizable by the temporary memorizing unit 1214, the TSP can be outputted to the software transport stream separating device 124 prior to the overflow of the TSP inputted to the temporary memorizing unit 1214. Thereby, the possible overflow in the temporary memorizing unit 1214 can be prevented, and the fail-soft transport stream processing apparatus can be provided.

In the description of the sixth preferred embodiment, the section filtering and the CRC check are executed subsequent to the descrambling step, however, the same effect can be achieved when the PES packet filtering is alternatively executed.

Seventh Preferred Embodiment

Figure 14:
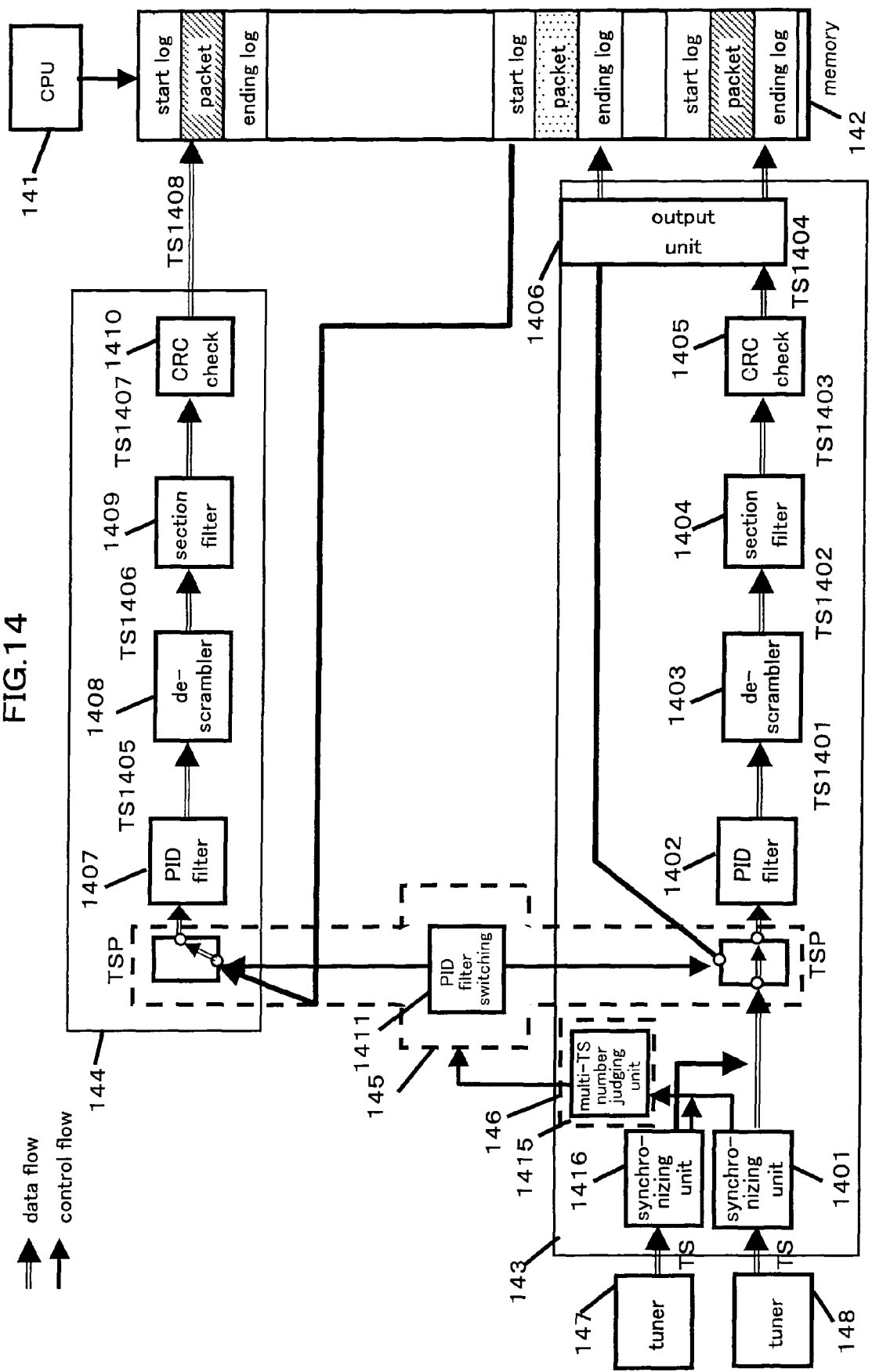
FIG. 14 is a block diagram illustrating an entire constitution of a stream processing apparatus according to a seventh preferred embodiment of the present invention.
Figure 15:
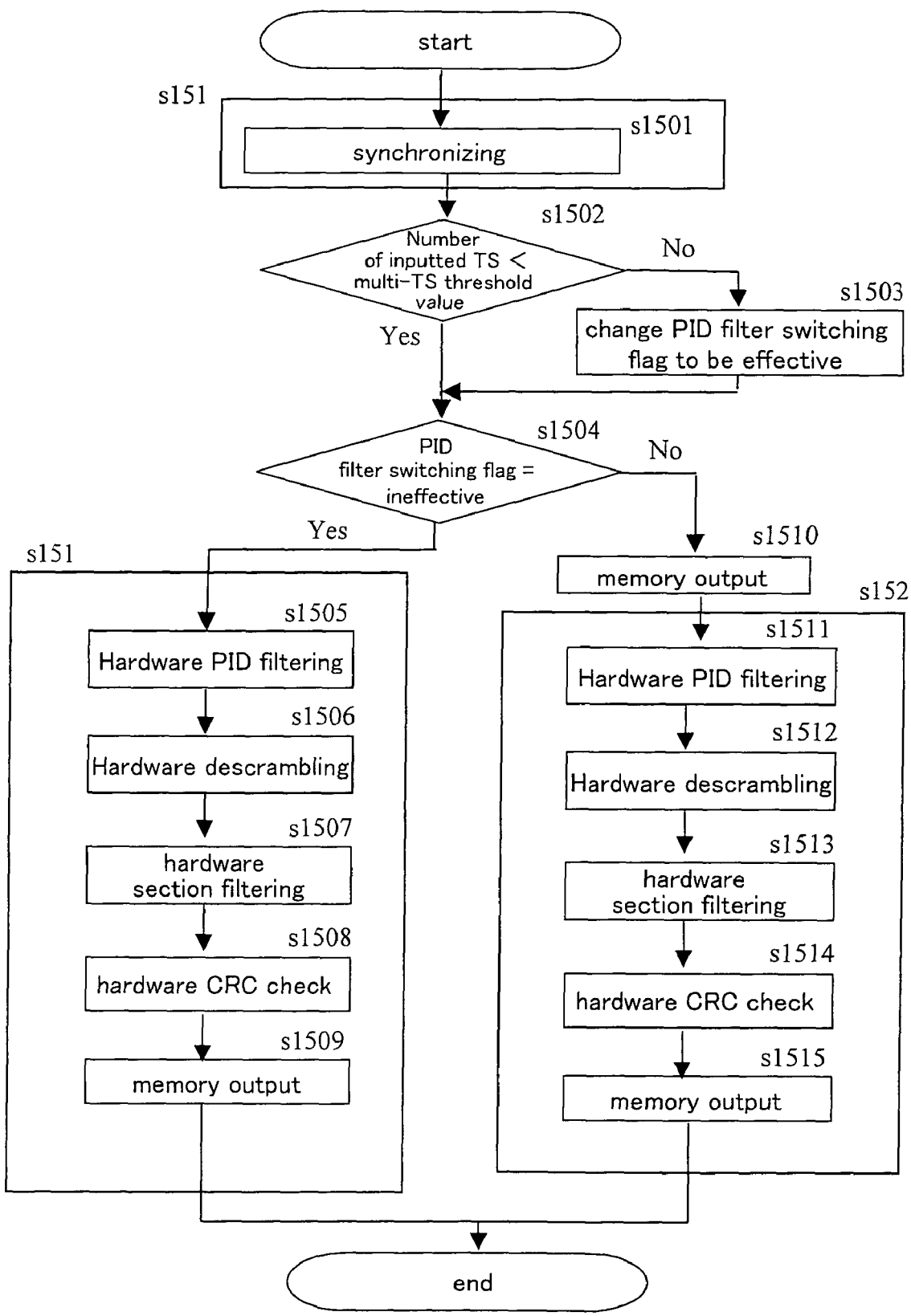
FIG. 15 is a flow chart according to the seventh preferred embodiment.

A seventh preferred embodiment of the present invention is described referring to FIGS. 14 and 15. In the seventh preferred embodiment, a multi-TS number judging unit 1415 is provided as the state judging device. The multi-TS number judging unit 1415 judges the number of synchronizing units 1401 and 1406 of a hardware transport stream separating device 143 currently in the process of inputting the TS as the number of the inputted TS, at least one of the synchronizing units 1401 and 1416 being provided in the hardware transport stream separating device 143. The multi-TS number judging unit 1415 further outputs the processing switching control signal to a processing switching device 145 so that the relevant TS is subjected to the software separating process when the judged number of the TS exceeds a multi-TS threshold value set by a CPU 141.

The processing switching device 145 receives the processing switching control signal and correspondingly changes the PID filter switching flag to be effective to thereby change a current setting so that the software transport stream separating process is executed.

FIG. 15 shows a processing flow chart.

In the fifth preferred embodiment is described a case in which a PID filtering switching step s1504 for switching to and from the processing respectively executed after the PID filtering step in the s151 using the hardware and after the PID filtering step in the s152 using the software is included as a switching step s153 and a multi-TS number judging step s1502 is included as a state judging step s154.

As a hardware transport stream separating step s151, a synchronizing step s1501, a PID filtering step s1505, a descrambling step s1506, a section filtering step s1507 and a CRC checking step s1508 are included.

As a software transport stream separating step s152, a PID filtering step s1511, a descrambling step s1512, a section filtering s1513 and a CRC checking step s1514 are included.

Below is given a description based on the processing flow.

The step s1501 is the synchronizing step, in which the leading data is detected from the inputted TS and the TSP is extracted, advances to the step s1502.

The multi-TS number judging step s1502 judges the number of synchronizing steps of the hardware transport stream separating device 143 currently in the process of inputting the TS as the number of the inputted TS, at least one of the synchronizing steps being provided the hardware transport stream separating device 143. The, the multi-TS number judging unit 1415 changes the PID filter switching flag to be effective in a step s1503 when the judged number of the TS exceeds the multi-TS threshold value set by the CPU 141 so that the processing of the relevant TS is switched to advance to the software separating process s152.

When the PID filter switching flag is ineffective in the PID filtering switching step s1504, the step s1504 advances to the step s1505 of the hardware transport separating step s151, while advancing to a step s1510 when the flag is effective. The step s1505 is the PID filtering step, in which only the necessary TSP is retrieved and the unnecessary TSP is discarded based on the PID of the inputted TSP, advances to the step s1506. The step s1506 is the descrambling step, in which the TSC of the TSP is judged, and the data is descrambled in the case of the scrambled data. The step s1506 executes no processing and immediately advances to the step s1507 in the case of the non-scrambled data.

The step s1507 is the section filtering step, in which the section is retrieved from the inputted TSP and the header part of the section is filtered so that the necessary section is retrieved and the unnecessary section is discarded, advances to the step s1508. The step s1508 is the CRC checking step, in which the CRC error of the section is checked, advances to a step s1509. The step s1509 is the memory output step, in which the data processed in the steps up to the step s1508 is outputted to a memory 142 accessible by the CPU 141.

Next is described a case in which the processing advances to the software transport stream separating step s152. The step s1510 is the memory output step, in which the data processed in the steps up to the step s1501 is outputted to the memory 142 accessible by the CPU 141, advances to the step s1511 of the software transport separating step s152. The step s1511 is the PID filtering step, in which the necessary TSP is retrieved and the unnecessary TSP is discarded based on the PID of the inputted TSP, advances to the step s1512.

In the step s1512 as the descrambling step, the TSC of the TSP is judged, and the data is descrambled in the case of the scrambled data and the step. The step s1512 executes no processing and immediately advances to the step s1513 out in the case of the non-scrambled data.

The step s1513 is the section filtering step, in which the section is retrieved from the inputted TSP and the header part of the section is filtered so that the necessary section is retrieved and the unnecessary section is discarded. Then, the step s1514 is carried out next.

The step s1514 is the CRC checking step, in which the CRC error of the section is checked. Then, a step s1515 is carried out next. The step s1515 is the memory output step, in which the data processed in the steps up to the step s1514 is outputted to the memory 142 accessible by the CPU 141.

When the multi-TS number threshold value settable by the Cpu is set to the maximum multi-TS number processable by the hardware transport stream separating device 143, the transport separating process can be switched to the software transport stream separating device 144 when the TS exceeding a processable volume is inputted to the hardware transport stream separating device 143. Thereby, the flexibly responsive transport stream processing apparatus can be provided without adding any circuit.

In the description of the seventh preferred embodiment, the section filtering and the CRC check are executed subsequent to the descrambling step, however, the same effect can be achieved when the PES packet filtering is alternatively executed.

Eighth Preferred Embodiment

Figure 16:
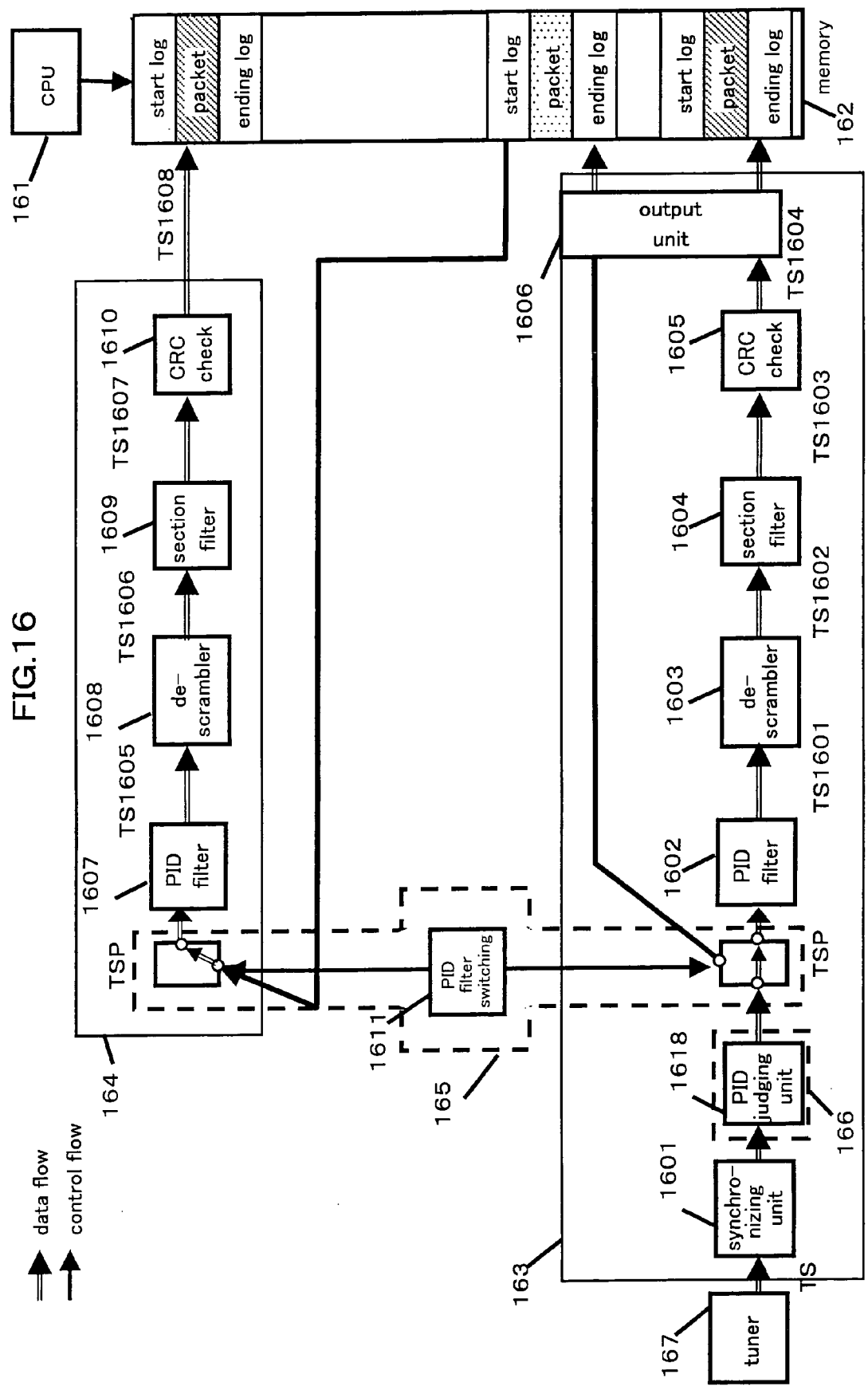
FIG. 16 is a block diagram illustrating an entire constitution of a stream processing apparatus according to an eighth preferred embodiment of the present invention.
Figure 17:
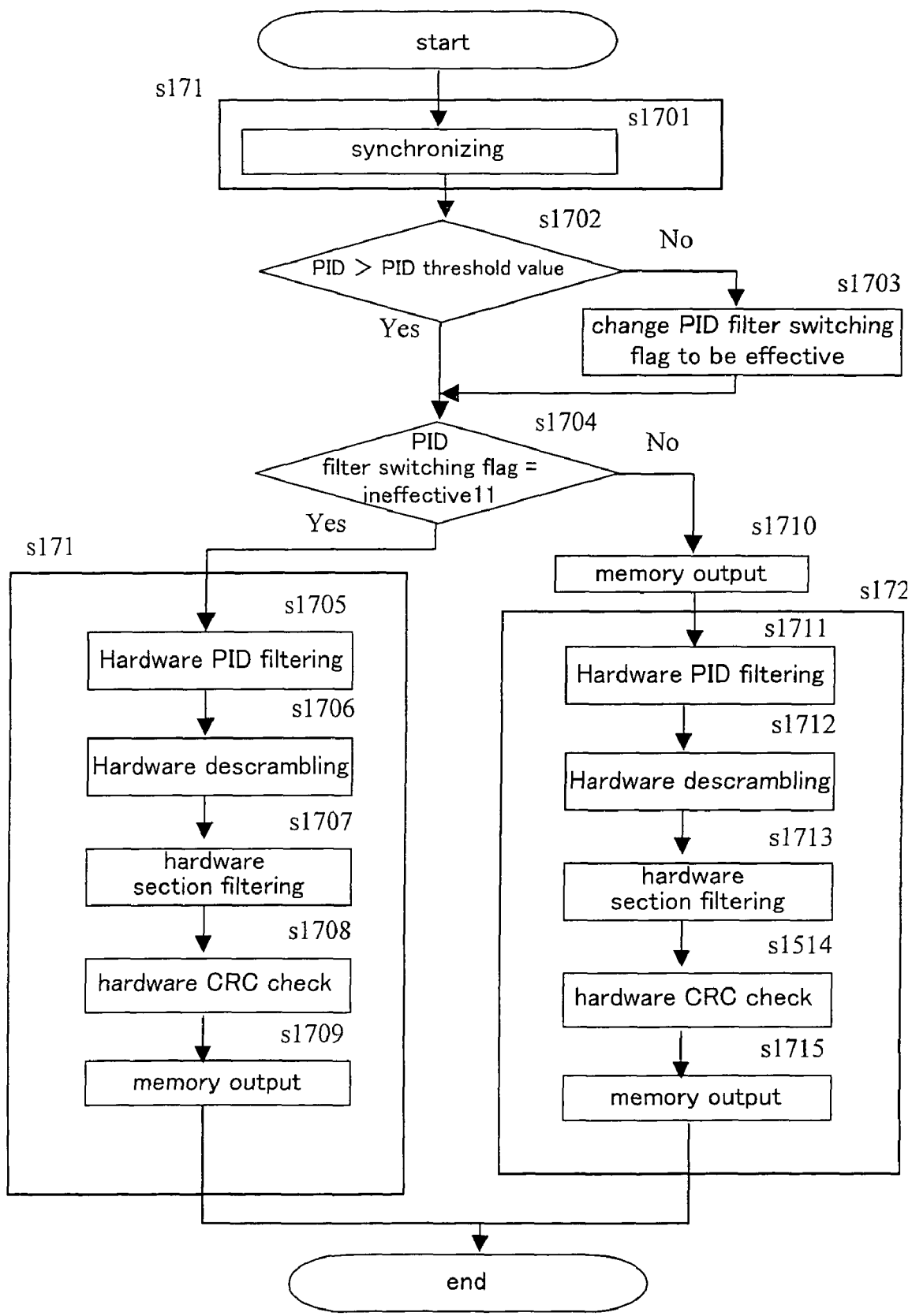
FIG. 17 is a flow chart according to the eighth preferred embodiment.

An eighth preferred embodiment of the present invention is described referring to FIGS. 16 and 17. In the eighth preferred embodiment, as the state judging device 106, a PID judging unit 1618 is provided. The PID judging unit 1618 judges the PID of the TSP inputted from a synchronizing unit 1601, and outputs the processing switching control signal to a processing switching device 165 so that the TSP satisfying a PID conditional expression is subjected to the software transport separating process.

The switching device 165 receives the processing switching control signal and correspondingly changes the PID filter switching flag to be effective to thereby change a current setting so that the software transport separating process can be executed. In the eighth preferred embodiment is described a case in which the TSP larger than a PID threshold value set by a CPU 161 is switched to be subjected to the software transport separating process.

FIG. 17 shows a processing flow chart.

In the fifth preferred embodiment is described a case in which a PID filtering switching step s1704 for switching to and from the processing respectively executed after the PID filtering step in the s171 using the hardware and after the PID filtering step in the s172 using the software is included as a switching step s173 and a PID judging step s1702 is included as a state judging step s174.

A hardware transport stream separating step s171 includes a synchronizing step s1701, a PID filtering step s1705, a descrambling step s1706, a section filtering step s1707 and a CRC checking step s1708.

A software transport stream separating step s172 includes a PID filtering step s1711, a descrambling step s1712, a section filtering step s1713 and a CRC checking step s1714.

Below is given a description based on the processing flow.

The step s1701 is the synchronizing step, in which the leading data is detected from the inputted TS and the TSP is extracted, advances to the step s1702.

The PID judging step s1702 judges the PID of the TSP inputted from the synchronizing unit 1601, and changes the PID filter switching flag to be effective in a step s1703 regarding the TSP whose PID is larger than the PID threshold value set by the CPU so that the processing of the relevant TSP is switched to advance to the software transport separating step s172. When the PID filter switching flag is ineffective in the step s1704, the step s1704 advances to the step s1705 of the hardware transport separating step s171, while advancing to a step s1710 when the flag is effective.

The step s1705 is the PID filtering step, in which only the necessary TSP is retrieved and the unnecessary TSP is discarded based on the PID of the inputted TSP, advances to the step s1706. In the step s1706 as the descrambling step, the TSC of the TSP is judged, and the data is descrambled in the case of the scrambled data, while the step s1707 immediately follows in the case of the non-scrambled data.

The step s1707 is the section filtering step, in which the section is retrieved from the inputted TSP and the header part of the section is filtered so that the necessary section is retrieved and the unnecessary section is discarded, advances to the step s1708. The step s1708 is the CRC checking step, in which the CRC error of the section is checked, advances to a step s1709.

The step s1709 is the memory output step, in which the data processed in the steps up to the step s1708 is outputted to a memory 162 accessible by the CPU 161.

Next is described a case in which the processing advances to the software transport separating step s172. The step s1710 is the memory output step, in which the data processed in the steps up to the step s1701 is outputted to the memory 162 accessible by the CPU 161, advances to the step s1711 of the software transport separating step s172. The step s1711 is the PID filtering step, in which only the necessary TSP is retrieved and the unnecessary TSP is discarded based on the PID of the inputted TSP, advances to the step s1712.

In the step s1712 is the descrambling step, in which the TSC of the TSP is judged, and the data is descrambled in the case of the scrambled data, while the step s1713 immediately follows in the case of the scrambled data.

The step s1713 is the section filtering step, in which the section is retrieved from the inputted TSP and the header part of the section is filtered so that the necessary section is retrieved and the unnecessary section is discarded, advances to the step s1714.

The step s1714 is the CRC checking step, in which the CRC error of the section is checked, advances to a step s1715. The step s1715 is the memory output step, in which the data processed in the steps up to the step s1714 is outputted to the memory 162 accessible by the CPU 161.

When the PID threshold value settable by the CPU 161 is set to a maximum value usable by the PDI for PSI/SI, the PID for PSI/SI can be selectively processed by the hardware transport separating device 163, while the data of the program equal to or over the maximum value can be selectively processed by the software transport stream separating device 164. Thereby, the processing can be selectively switched based on the PID.

In the description of the eighth preferred embodiment, the section filtering and the CRC check are executed subsequent to the descrambling step, however, the same effect can be achieved when the PES packet filtering is alternatively executed.

Ninth Preferred Embodiment

Figure 18:
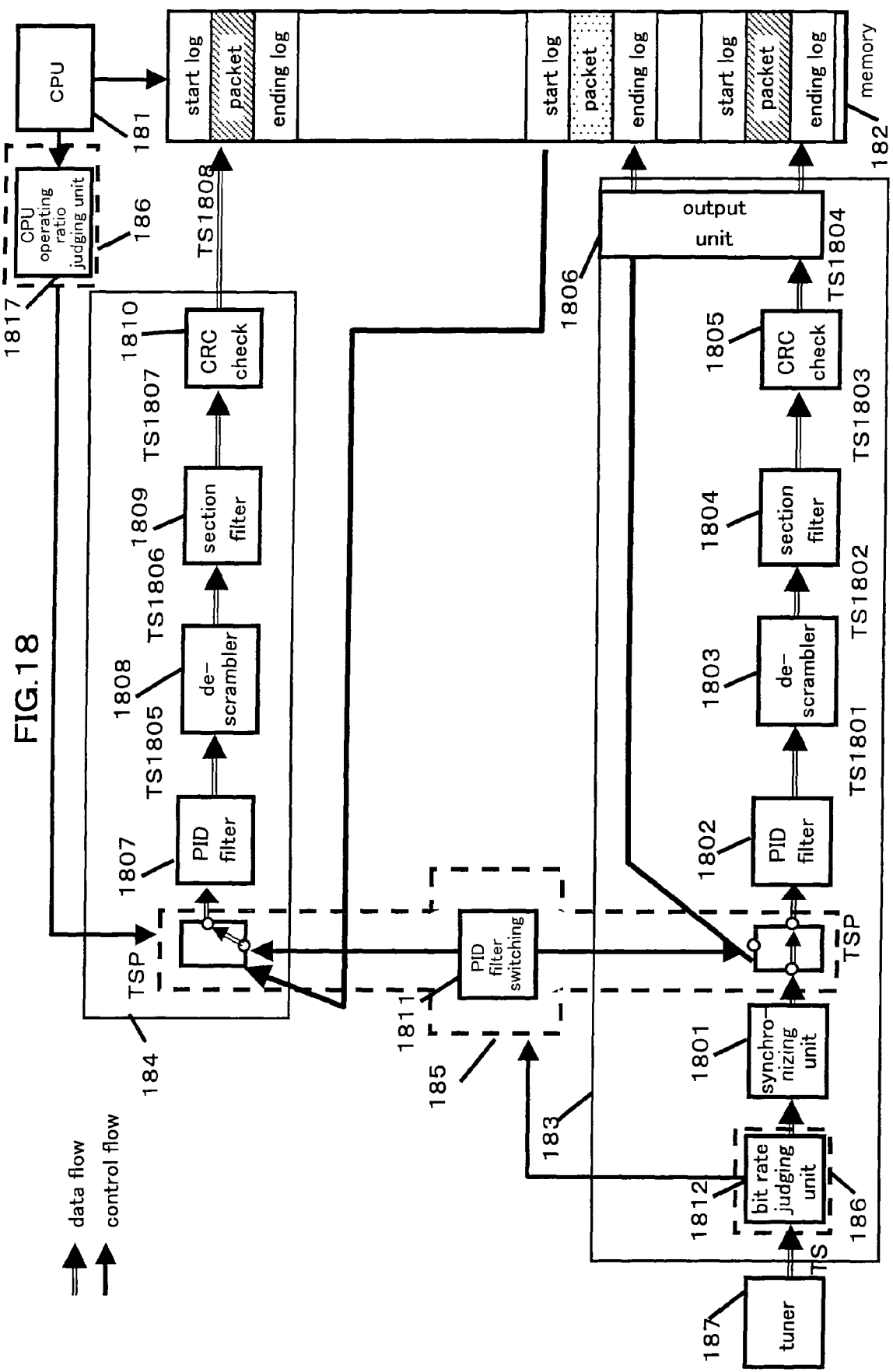
FIG. 18 is a block diagram illustrating an entire constitution of a stream processing apparatus according to a ninth preferred embodiment of the present invention.
Figure 19:
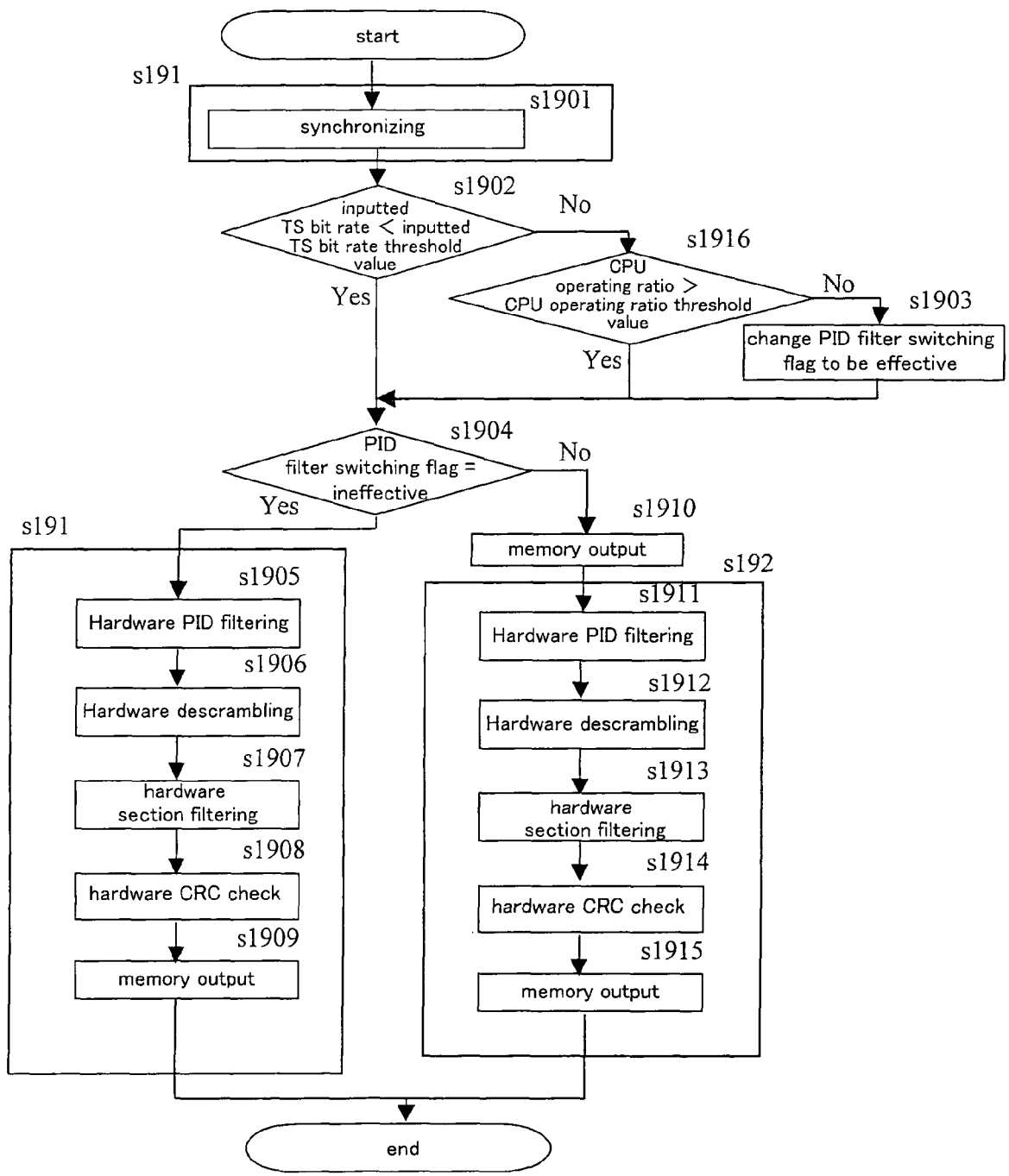
FIG. 19 is a flow chart according to the ninth preferred embodiment.
Figure 20:
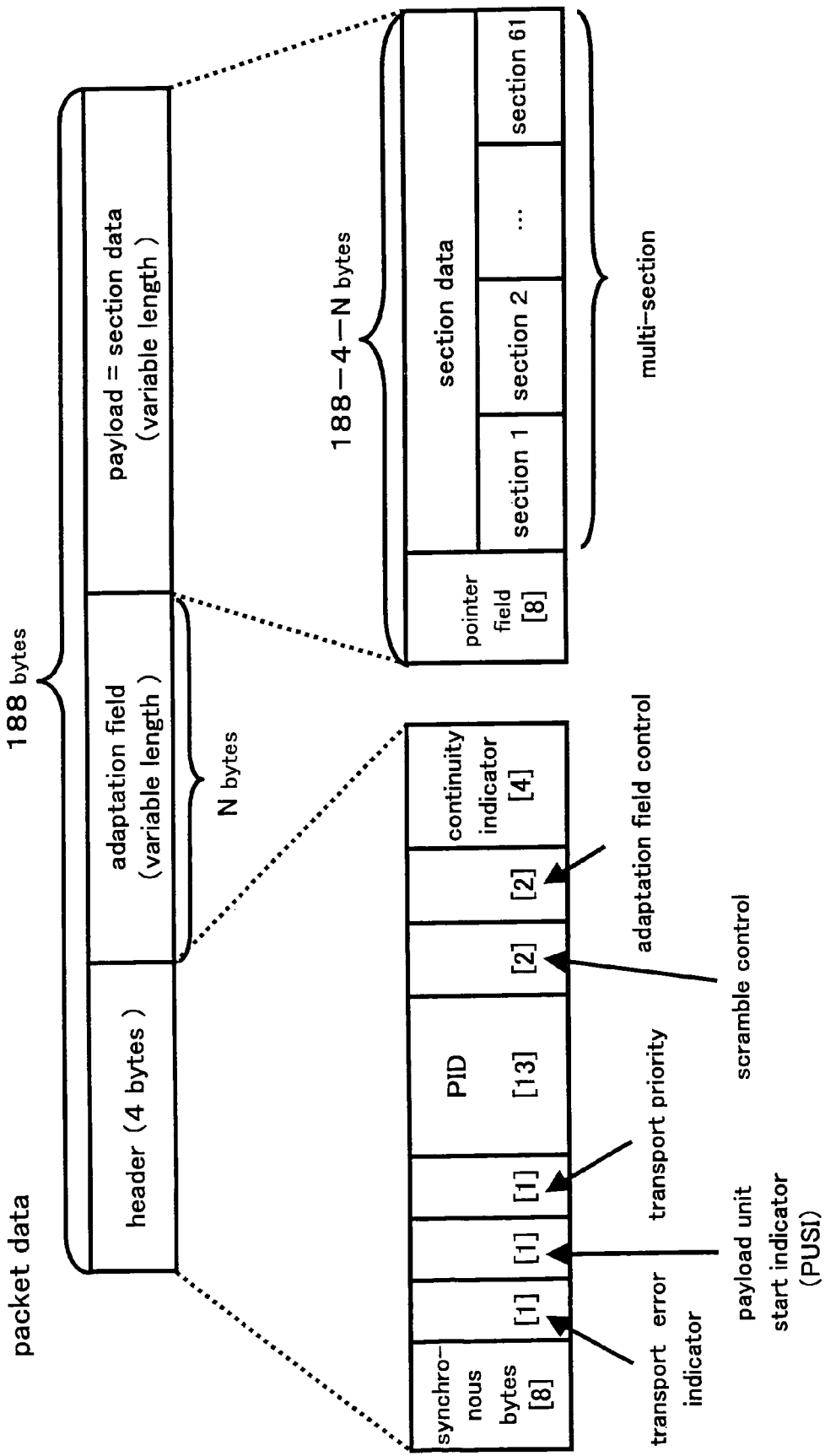
FIG. 20 shows a constitution of a transport stream packet.

A ninth preferred embodiment of the present invention is described referring to FIGS. 18 and 19. In the ninth preferred embodiment, a CPU operating ratio judging unit 1817 is provided as the state judging device. The CPU operating ratio judging unit 1817 judges an operating ratio of the software operated on a CPU 181 as a CPU operating ratio, and outputs a control signal so as to allow the TS to be subjected to the software transport separation only when the CPU operating ratio is smaller than a CPU operating ratio threshold value set by the CPU 181.

FIG. 19 shows a processing flow chart.

In the fifth preferred embodiment is described a case in which a PID filtering switching step s1904 for switching to and from the processing respectively executed after the PID filtering step in the s191 using the hardware and after the PID filtering step in the s192 using the software is included as a switching step s193 and a bit rate judging step s1902 and a CPU operating ratio judging step s1916 is included as a state judging step s194.

As a hardware transport stream separating step s191, a synchronizing step s1901, a PID filtering step s1905, a descrambling step s1906, a section filtering step s1907 and a CRC checking step s1908 are included.

As a software transport stream separating step s192, a PID filtering step s1911, a descrambling step s1912, a section filtering step s1913 and a CRC checking step s1914 are included.

Below is given a description based on the processing flow.

The step s1901 is the synchronizing step, in which the leading data is detected from the inputted TS and the TSP is extracted. Then, the step s1902 follows.

The bit rate judging step s1902 judges the bit rate of the TS inputted in the synchronizing step s1901, and advances to the CPU operating ratio judging step s1916 when the judged bit rate exceeds the bit rate threshold value set by the CPU 181. The CPU operating ratio judging step s1916 changes the PID filter switching flag to be effective in a step s1903 when the CPU operating ratio is smaller than the CPU operating ratio threshold value so that the processing is switched to advance to the software transport separating step s192.

When the PID filter switching flag is ineffective in the PID filter switching step s1904, the step s1905 of the hardware transport separating step s191 follows, while a step s1910 follows when the flag is effective.

The step s1905 as the PID filtering step retrieves only the necessary TSP and discards the unnecessary TSP based on the PID of the inputted TSP, and then advances to the next step s1906.

The step s1906 as the descrambling step judges the TSC of the TSP, and descrambles the data in the case of the scrambled data, while immediately advancing to the step s1907 in the case of the non-scrambled data. The step s1907 as the section filtering step retrieves the section from the inputted TSP and filters the header part of the section to thereby retrieve the necessary section and discard the unnecessary section, and then advances to the step s1908. The step s1908 as the CRC checking step checks the CRC error of the section, and then advances to a step s1909. The step s1909 as the memory output step outputs the data processed in the steps up to the step s1908 to the memory 182 accessible by the CPU 181.

Next is described a case in which the processing advances to the software transport separating step s192.

The step s1910 as the memory output step outputs the data processed in the steps up to the step s1901 to the memory 182 accessible by the CPU 181, and then advances to the step s1911 of the software transport separating step s192. The step s1911 as the PID filtering step retrieves only the necessary TSP, while discarding the unnecessary TSP based on the PID of the inputted TSP, and then advances to the next step s1912. The step s1912 as the descrambling step judges the TSC (Transport Scramble Control) of the TSP, and descrambles the data in the case of the scrambled data, while immediately advancing to the step s1913 in the case of the non-scrambled data.

The step s1913 as the section filtering step retrieves the section from the inputted TSP and filters the header part of the section to thereby retrieve the necessary section while discarding the unnecessary section, and then advances to the step s1914.

The step s1914 as the CRC checking step checks the CRC error of the section, and then advances to a step s1915. The step s1915 as the memory output step outputs the data processed in the steps up to the step s1914 to the memory 182 accessible by the CPU 181.

As described, when the operating state of the CPU 181 is added to the elements for judging the switchover of the hardware transport stream separating device 183 to the software transport stream separating device 184, such a situation that other software processing may be broken down due to a processing load of the software transport stream separating device 184 can be prevented.

Further, in the description of the ninth preferred embodiment, the section filtering and the CRC check are executed subsequent to the descrambling step, however, the same effect can be achieved when the PES packet filtering is alternatively executed.

While the invention has been described and illustrated in detail, it is to be clearly understood that this is intended be way of illustration and example only and is not to be taken by way of limitation, the spirit and scope of this invention being limited only be the terms of the following claims.

What is claimed is:

1. A transport stream processing apparatus for executing a plurality of processing steps for separating desired data from a transport stream, the apparatus comprising:
   a hardware transport stream separating device;
   a software transport stream separating device;
   a processing switching device for switching between the hardware transport stream separating device and the software transport stream separating device in executing an optional processing step;
   a processor;
   a memorizing device accessible by the software operated on the processor; and
   an output device for outputting an output result in the optional processing step to the memorizing device, wherein:
   the transport stream processing apparatus comprises, as devices for executing the plurality of processing steps:
   a synchronizing device for retrieving data from an inputted transport stream (TS) per transport stream packet (TSP);
   a packet identifier (PID) filtering device for filtering the inputted TSP in accordance with PID thereof;
   a descrambling device for descrambling the PID-filtered TSP;

a section filtering device for detecting a section as a predetermined data transfer unit from the PID-filtered and descrambled data and filtering the detected section in accordance with a section pattern; and a CRC checking device for detecting a CRC error of the section, the processing switching device comprises a CRC check switching flag and executes a CRC check using hardware when the CRC check switching flag is ineffective, the processing switching device further executes the CRC check using software when the CRC check switching flag is effective, the processing switching device provides a CRC log denoting a result of the CRC check using the hardware for the section when the CRC check switching flag is ineffective, and the processing switching device provides the CRC log denoting omission of the CRC check using the hardware for the section or outputs the section from the output device to the memorizing device without the provision of the CRC log when the CRC check switching flag is effective so that necessity of the CRC check using the software is judged based on the CRC log.

2. A transport stream processing apparatus for executing a plurality of processing steps for separating desired data from a transport stream, the apparatus comprising:

a hardware transport stream separating device;

a software transport stream separating device;

a processing switching device for switching between the hardware transport stream separating device and the software transport stream separating device in executing an optional processing step;

a processor;

a memorizing device accessible by the software operated on the processor; and an output device for outputting an output result in the optional processing step to the memorizing device, wherein:

the transport stream processing apparatus comprises, as devices for executing the plurality of processing steps:

a synchronizing device for retrieving data from an inputted transport stream (TS) per transport stream packet (TSP);

a packet identifier (PID) filtering device for filtering the inputted TSP in accordance with PID thereof;

a descrambling device for descrambling the PID-filtered TSP;

a section filtering device for detecting a section as a predetermined data transfer unit from the PID-filtered and descrambled data and filtering the detected section in accordance with a section pattern; and a CRC checking device for detecting a CRC error of the section, the processing switching device comprises a section filtering switching flag and executes a section filtering using hardware when the section filtering switching flag is ineffective, the processing switching device further executes the section filtering using software when the section filtering switching flag is effective, the processing switching device provides a section filtering log denoting execution of the section filtering using the hardware for the section when the section filtering switching flag is ineffective, and the processing switching device provides the section filtering log denoting omission of the section filtering using the hardware for the section or a part of a payload or outputs the section without the provision of the section filtering log from the output device to the memorizing device when the section filtering switching flag is effective so that necessity of the section filtering using software is judged based on the section filtering log.

3. A transport stream processing apparatus for executing a plurality of processing steps for separating desired data from a transport stream, the apparatus comprising:

a hardware transport stream separating device;

a software transport stream separating device; and a processing switching device for switching between the hardware transport stream separating device and the software transport stream separating device in executing an optional processing step; and a state judging device for obtaining a multi-section number multiplexed in one transport stream packet and outputting a processing switching order for changing switchover in the processing switching device in accordance with the multi-section number, wherein:

the transport stream processing apparatus comprises, as devices for executing the plurality of processing steps:

a synchronizing device for retrieving data from an inputted transport stream (TS) per transport stream packet (TSP);

a packet identifier (PID) filtering device for filtering the inputted TSP in accordance with PID thereof;

a descrambling device for descrambling the PID-filtered TSP; and a packaged elementary stream (PES) packet filtering device for detecting a packaged elementary stream (PES) packet as a predetermined data transfer unit from the PID-filtered and descrambled data and filtering the detected packet in accordance with a PES packet pattern, the processing switching device comprises a PES packet filtering switching flag and executes a PES packet filtering using hardware when the PES packet filtering switching flag is ineffective, the processing switching device further executes the PES packet filtering using software when the PES packet filtering switching flag is effective, the processing switching device executes the PES packet filtering using the hardware and provides a PES packet filtering log denoting execution of the PES packet filtering using the hardware for the PES packet when the PES packet filtering switching flag is ineffective, and the processing switching device provides a PES packet filtering log denoting omission of the PES packet filtering using the hardware for the PES packet or outputs the PES packet from the output device to the memorizing device without the provision of the PES packet filtering log when the PES packet filtering switching flag is effective so that necessity of the PES packet filtering using the software is judged based on the PES packet filtering log.

4. A transport stream processing apparatus for executing a plurality of processing steps for separating desired data from a transport stream, the apparatus comprising:

a hardware transport stream separating device;

a software transport stream separating device; and a processing switching device for switching between the hardware transport stream separating device and the software transport stream separating device in executing an optional processing step;

a state judging device for obtaining a multi-section number multiplexed in one transport stream packet and outputting a processing switching order for changing switchover in the processing switching device in accordance with the multi-section number;
a temporary memory device for temporarily memorizing an inputted transport stream packet (TSP); and
a temporary memory TSP number judging device for judging number of the TSP memorized in the temporary memory and comparing the number of the TSP to a TSP threshold value, the temporary memory TSP number judging device further outputting a processing switching order for changing the switchover between a hardware process and a software process of the optional processing step in the processing switching device as the state judging device.

5. A transport stream processing apparatus for executing a plurality of processing steps for separating desired data from a transport stream, the apparatus comprising:
a hardware transport stream separating device;
a software transport stream separating device; and
a processing switching device for switching between the hardware transport stream separating device and the software transport stream separating device in executing an optional processing step;
a state judging device for obtaining a multi-section number multiplexed in one transport stream packet and outputting a processing switching order for changing switchover in the processing switching device in accordance with the multi-section number;
a synchronizing device for retrieving data from an inputted transport stream (TS) per transport stream packet (TSP); and
a multi-TS number judging device for judging number of the TS inputted to the synchronizing device and comparing the number of the TS to a multi-TS threshold value, the multi-TS number judging device further outputting a processing switching order for changing the switchover between a hardware process and a software process of the optional processing step in the processing switching device as the state judging device.

6. A transport stream processing apparatus for executing a plurality of processing steps for separating desired data from a transport stream, the apparatus comprising:
a hardware transport stream separating device;
a software transport stream separating device; and
a processing switching device for switching between the hardware transport stream separating device and the software transport stream separating device in executing an optional processing step;
a state judging device for obtaining a multi-section number multiplexed in one transport stream packet and outputting a processing switching order for changing switchover in the processing switching device in accordance with the multi-section number;
a transport stream packet (TSP) processing time judging device for judging a processing time between a time point when the TSP is inputted to the synchronizing device and a time point when the desired data is separated from the TSP and comparing the processing time to a processing time threshold value, the TSP processing time judging device further outputting a processing switching order for changing the switchover between a hardware process and a software process of the optional processing step in the processing switching device as the state judging device.

7. A transport stream processing apparatus for executing a plurality of processing steps for separating desired data from a transport stream, the apparatus comprising:
a hardware transport stream separating device;
a software transport stream separating device; and
a processing switching device for switching between the hardware transport stream separating device and the software transport stream separating device in executing an optional processing step;
a state judging device for obtaining a multi-section number multiplexed in one transport stream packet and outputting a processing switching order for changing switchover in the processing switching device in accordance with the multi-section number;
a CPU operating ratio judging device for judging an operating ratio of software operated on the processor, that is a CPU operating ratio, and comparing the CPU operating ratio to a CPU operating ratio threshold value, the CPU operating ratio judging device further outputting a processing switching order for changing the switchover between a hardware process and a software process of the optional processing step in the processing switching device as the state judging device.

* * * * *